US012342119B2

(12) United States Patent
Sun et al.

(10) Patent No.: US 12,342,119 B2
(45) Date of Patent: Jun. 24, 2025

(54) WIND NOISE SUPPRESSION DEVICE AND DESIGN METHOD

(71) Applicant: HUAWEI TECHNOLOGIES CO., LTD., Guangdong (CN)

(72) Inventors: Yuhao Sun, Shenzhen (CN); Yulong Li, Shenzhen (CN); Fan Fan, Shenzhen (CN); Xiaowei Yu, Shenzhen (CN); Xiaohong Yang, Shenzhen (CN); Yangshan Ou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 71 days.

(21) Appl. No.: 18/340,244

(22) Filed: Jun. 23, 2023

(65) Prior Publication Data

US 2023/0336901 A1 Oct. 19, 2023

Related U.S. Application Data

(63) Continuation of application No. PCT/CN2021/138527, filed on Dec. 15, 2021.

(30) Foreign Application Priority Data

Dec. 25, 2020 (CN) ........................ 202011567560.7

(51) Int. Cl.
*H04R 1/08* (2006.01)
*H04R 1/04* (2006.01)
(Continued)

(52) U.S. Cl.
CPC ............... *H04R 1/086* (2013.01); *H04R 1/04* (2013.01); *H04R 1/1075* (2013.01);
(Continued)

(58) Field of Classification Search
CPC ........ H04R 1/086; H04R 1/04; H04R 1/1075; H04R 1/2876; H04R 29/004; H04R 2410/07; G10K 11/002
(Continued)

(56) References Cited

U.S. PATENT DOCUMENTS 9,579,745 B2 2/2017 Cohen et al.
2006/0034476 A1 2/2006 Glezerman
(Continued)

FOREIGN PATENT DOCUMENTS

CN 207638827 U 7/2018
CN 110856076 A 2/2020
(Continued)

*Primary Examiner* — George C Monikang
(74) *Attorney, Agent, or Firm* — Rimon PC

(57) ABSTRACT

Embodiments of this application disclose a wind noise suppression device including a first woven mesh, a second woven mesh, a device housing, and a structural component. The device housing defines a sound pickup hole. The first woven mesh covers the sound pickup hole. The structural component is disposed behind the sound pickup hole. The structural component is coupled to the device housing and forms a cavity. The structural component defines a sound transmission hole. The second woven mesh covers the sound transmission hole. A microphone is disposed at the sound transmission hole. Due to the structural characteristics of all the components the device, wind noise included in an audio signal that is be received by the microphone through the sound transmission hole is effectively reduced.

18 Claims, 24 Drawing Sheets

(51) Int. Cl.
*H04R 1/10* (2006.01)
*H04R 1/28* (2006.01)
*H04R 29/00* (2006.01)

(52) U.S. Cl.
CPC ......... *H04R 1/2876* (2013.01); *H04R 29/004* (2013.01); *H04R 2410/07* (2013.01)

(58) Field of Classification Search
USPC .................................................. 381/322, 324
See application file for complete search history.

(56) References Cited

U.S. PATENT DOCUMENTS

| | | | | |
|---|---|---|---|---|
| 2015/0110320 | A1* | 4/2015 | Liu | H04R 1/44<br>381/322 |
| 2017/0366889 | A1 | 12/2017 | Schipper | |
| 2020/0053458 | A1 | 2/2020 | Ring et al. | |

FOREIGN PATENT DOCUMENTS

| | | | |
|---|---|---|---|
| CN | 111866650 | A | 10/2020 |
| JP | H11308685 | A | 11/1999 |
| JP | 2008154036 | A | 7/2008 |
| JP | 2014082715 | A | 5/2014 |
| JP | 2018191078 | A | 11/2018 |
| JP | 2019012119 | A | 1/2019 |
| KR | 20140033460 | A | 3/2014 |
| WO | 2013141158 | A1 | 9/2013 |
| WO | 2014035571 | A1 | 3/2014 |

* cited by examiner (a)

(b)

(a)

(b)

(a)

(b)

WIND NOISE SUPPRESSION DEVICE AND DESIGN METHOD

CROSS-REFERENCE TO RELATED APPLICATIONS

This application is a continuation of International Application No. PCT/CN2021/138527, filed on Dec. 15, 2021, which claims priority to Chinese Patent Application No. 202011567560.7, filed on Dec. 25, 2020. The disclosures of the aforementioned applications are hereby incorporated by reference in their entireties.

TECHNICAL FIELD

This application generally relates to the wind noise processing field, and in particular, to a wind noise suppression device and a design method.

BACKGROUND

Typically, when a user is in an environment with a flowing airflow (e.g., wind), and the user uses a microphone function of an electronic device, the flowing airflow collides with the electronic device, and consequently the electronic device receives a pressure fluctuation. The time-varying pressure fluctuation forms wind noise. The microphone receives a wind noise signal, which is transmitted to a human ear through a speaker. As a result, the user hears noise. Conventional devices to resolve this issue typically include a component that is configured to prevent a microphone diaphragm from being affected by a comparatively large sudden change of pressure. However, these components typically have a comparatively small effect on continuous pressure fluctuation generated by flowing of an airflow and have a comparatively low intensity, and cannot effectively suppress wind noise. Therefore, how to reduce wind noise caused by impact of an irregular airflow on an electronic device is an urgent problem to be resolved.

SUMMARY

Embodiments of this application provide for a wind noise suppression device and a design method, to resolve a problem of how to reduce wind noise caused by impact of an irregular airflow on an electronic device.

According to a first aspect, this application provides a wind noise suppression device. The wind noise suppression device includes a first woven mesh, a second woven mesh, a device housing, a structural component, and a microphone. The device housing defines a sound pickup hole, and the first woven mesh covers the sound pickup hole. The first woven mesh is configured to reduce disturbance of an airflow inside the device caused by an airflow outside the device housing entering the device through the sound pickup hole, and reduce pressure fluctuation of the airflow outside the device housing at the sound pickup hole. The structural component is disposed behind the sound pickup hole (e.g., the structural component is disposed further away from the first woven mesh than the sound pickup), and the structural component is fluidly communicable with the outside through the sound pickup hole. The structural component is configured to propagate an audio signal picked up (e.g., received) by the sound pickup hole. The structural component is a hollow structure, and the structural component is connected (e.g., coupled) to the device housing, thereby forming a cavity. The cavity covers the sound pickup hole, and a distance between a sound transmission hole and a plane in which the sound pickup hole is located is greater than or equal to a preset threshold. The structural component is provided with the sound transmission hole. The microphone is disposed in the sound transmission hole. The microphone is configured to capture a sound signal. The second woven mesh covers the sound transmission hole. The second woven mesh is configured to reduce impact of an airflow change in the cavity on a diaphragm of the microphone connected to the sound transmission hole, and as well as to keep out water and dust (i.e., prevent ingress).

Typically, an irregular airflow collides with the wind noise suppression device and wind noise is generated. The wind noise suppression device picks up, through the sound pickup hole, an audio signal that includes the wind noise. After the audio signal passes through the first woven mesh, the structural component, and the second woven mesh included in the wind noise suppression device, due to the structural characteristics of the sound pickup hole, the first woven mesh, the structural component, and the second woven mesh can suppress wind noise energy and the wind noise included in the audio signal received by the microphone through the sound transmission hole is effectively reduced. This arrangement reduces a wind noise sound heard by a user, and improves user experience of the user due to the reduction of wind noise when utilizing a microphone function of an electronic device having the wind noise suppression device.

It should be understood that the first woven mesh, the second woven mesh, the structural component, and the microphone are disposed inside the device housing. The first woven mesh, the device housing, the structural component, the second woven mesh, and the microphone are sequentially stacked.

In a possible design, the structural component includes a tubular structure defining openings at two opposing ends of the tubular structure and a cover may be located in an opening at one end of the tubular structure. The cover defines the sound transmission hole. The sound pickup hole is covered by an orthographic projection that is representative of an opening at the other end of the tubular structure and that is disposed on the device housing. It can be understood that the opening at the other end of the structural component completely covers the sound pickup hole. A radial-direction size of the sound pickup hole is less than or equal to a radial-direction size of the hollow structure formed by the structural component.

In another possible design, the second woven mesh is clamped between the tubular structure and the cover.

In another possible design, the second woven mesh is clamped between the device housing and the structural component. It can be understood that the first woven mesh, the device housing, and the second woven mesh form a first cavity, and the second woven mesh and the structural component form a second cavity. The second cavity covers the sound pickup hole, and a height of the second cavity in a direction perpendicular to the plane in which the sound pickup hole is located is greater than or equal to a preset threshold. The first woven mesh, the device housing, the second woven mesh, the structural component, and the microphone are sequentially stacked.

The first woven mesh may be a metal mesh, a mesh density of the first woven mesh is greater than or equal to 300 meshes, and an impedance of the first woven mesh is less than or equal to 200 meter-kilogram-second rayleighs (MKS rayls). The second woven mesh may be an acoustic mesh fabric, and an impedance of the second woven mesh is greater than or equal to 200 MKS rayls.

In this embodiment, the woven mesh at a position of the sound pickup hole is used for blocking a flowing airflow from entering the cavity and forming a disturbance, thereby reducing wind noise energy. In addition, because the woven mesh at the sound pickup hole has a rough surface, intensity of pressure fluctuation at the sound pickup hole can be further reduced.

In another possible design, the wind noise suppression device further includes a third woven mesh, and the third woven mesh is clamped between the device housing and the structural component. The third woven mesh is configured to reduce disturbance of an airflow inside the device caused by an airflow outside the device housing entering the device through the sound pickup hole. It can be understood that the first woven mesh, the device housing, and the third woven mesh form a first cavity, the third woven mesh, the structural component, and the second woven mesh form a second cavity, the second cavity covers the sound pickup hole, and a height of the second cavity in a direction perpendicular to the plane in which the sound pickup hole is located is greater than or equal to a preset threshold. The second woven mesh may be clamped between the tubular structure and the cover. The first woven mesh, the device housing, the third woven mesh, the structural component, the second woven mesh, and the microphone are sequentially stacked.

In another possible design, the second woven mesh is clamped between the device housing and the structural component. The wind noise suppression device further includes a third woven mesh, and the third woven mesh is clamped between the device housing and the second woven mesh. It can be understood that the first woven mesh, the device housing, the third woven mesh, and the second woven mesh form a first cavity, and the third woven mesh, the second woven mesh, and the structural component form a second cavity. The first woven mesh, the device housing, the third woven mesh, the second woven mesh, the structural component, and the microphone are sequentially stacked.

Because of the structural characteristics of the sound pickup hole, the first woven mesh, the structural component, the second woven mesh, and the third woven mesh can suppress wind noise energy, wind noise included in an audio signal received by the microphone through the sound transmission hole is effectively reduced. This arrangement reduces a wind noise sound heard by a user, and improves a user experience of the user when utilizing a microphone function of an electronic device.

Both the first woven mesh and the third woven mesh may be metal meshes, a mesh density of the first woven mesh is less than or equal to a mesh density of the third woven mesh, the mesh density of the first woven mesh is less than or equal to 1000 meshes, and the mesh density of the third woven mesh is less than or equal to 1000 meshes.

The second woven mesh may be an acoustic mesh fabric, and an impedance of the second woven mesh is greater than or equal to 200 MKS rayls.

In addition, a size (e.g., area) of the sound pickup hole is greater than a size (e.g., area) of the sound transmission hole.

The preset threshold is determined based on the size (e.g., area) of the sound pickup hole. A value range of the preset threshold may be 1-30 millimeters.

A volume of the structural component in this embodiment may be less than 1 cubic centimeter. In this way, the structural component can be disposed in a miniaturized electronic device, to suppress wind noise.

In addition, the cavity in this embodiment may be further filled with a foam material. The foam material is configured to reduce disturbance of an airflow inside the device caused by an airflow outside the device housing entering the device through the sound pickup hole. For example, at least one of the first cavity and the second cavity is filled with the foam material. In this way, the foam material is used for further reducing pressure fluctuation generated by a vortex, and blocking a case of a large sudden change of a flow field.

The wind noise suppression device further includes a sound wave guide tube. One end of the sound wave guide tube is fluidly coupled to the sound transmission hole of the structural component, and the other end of the sound wave guide tube is fluidly coupled to the microphone. This helps the microphone receive an audio signal that passes through the sound transmission hole.

According to a second aspect, this application provides a headset. The headset includes the wind noise suppression device according to the first aspect. The sound pickup hole of the headset is configured to pick up a first audio signal. The first audio signal passes through the woven mesh (e.g., the first woven mesh) and the structural component that are in the wind noise suppression device, so that a second audio signal is obtained. Both the first audio signal and the second audio signal include effective audio signals. Wind noise energy included in the second audio signal is less than wind noise energy included in the first audio signal.

According to a third aspect, this application provides a method for designing a wind noise suppression device. The method includes calculating flow field information of a plurality of sampling points on a device housing of the wind noise suppression device according to any one of the foregoing aspects. The flow field information may be calculated by using hydrodynamics based on a target wind speed, a target frequency, and expected wind noise reduction, where the flow field information includes time-varying speed and pressure fluctuation. The method further includes determining a sampling point that is in the plurality of sampling points and that has smallest pressure fluctuation within a target frequency range, as a position of a sound pickup hole on the device housing of the wind noise suppression device. The method further includes determining, based on a vortex correlation length at the sound pickup hole, the target wind speed, the target frequency, the expected wind noise reduction, and a dispersion relationship of sound wave propagation in a cavity, a size (e.g., area) of the sound pickup hole and a size (e.g., area) of the cavity of a structural component included in the wind noise suppression device, where the vortex correlation length is determined based on the time-varying speed and pressure fluctuation. Therefore, the sound pickup hole of the device is enlarged, and the structural component and the woven mesh are installed in the device, so that pressure fluctuation generated by vortex structure shear and impact can be effectively reduced on a basis of preventing a gust. This arrangement reduces wind noise received by the device in a target frequency range, and improves audio quality and an application scope of the product. In addition, while achieving a same reduction in wind noise, the wind noise suppression device provided in this embodiment defines a smaller structural space. When the structural space defines a same size, the wind noise suppression device provided in some embodiments have a higher applicability to be utilized in devices and result in a larger wind noise reduction.

DESCRIPTION OF EMBODIMENTS

Embodiments of a wind noise suppression device are provided in this application that may be applied to devices including, but not limited to, a headset product with functions such as a call function, an audio positioning function, and a noise reduction function, a mobile phone, a tablet computer, a portable computer, a wearable device (such as a watch or glasses), and the like. A specific form of an electronic device that includes the wind noise suppression device is not limited in this application. When a user is in an environment in which an external airflow flows (e.g., wind), and the user utilizes a microphone function of the electronic device, the wind noise suppression device of the electronic device suppresses wind noise energy. In other words, an audio signal that includes wind noise, due to structural characteristics of a structural component and a woven mesh that are included in the wind noise suppression device, can have suppressed wind noise energy after the audio signal passes through the structural component and the woven mesh. Accordingly, wind noise energy included in the audio signal received by a microphone is less than wind noise energy at a sound pickup hole of the wind noise suppression device. Therefore, the wind noise suppression device provided in this application can effectively reduce wind noise caused by an impact of an irregular airflow on the device, thereby reducing a wind noise sound heard by the user, and improving user experience of the user when the device picks up a sound. The environment in which the user picks up a sound by using the wind noise suppression device and an external airflow flows includes, but is not limited to, an outdoor or indoor windy environment, a walking environment of the user, a running environment of the user, a cycling environment of the user, and the like.

The following disclosure describes, in detail, implementations of embodiments of this application with reference to accompanying drawings. Herein, an example in which the wind noise suppression device is a headset product is used for description.

Figure 1A:
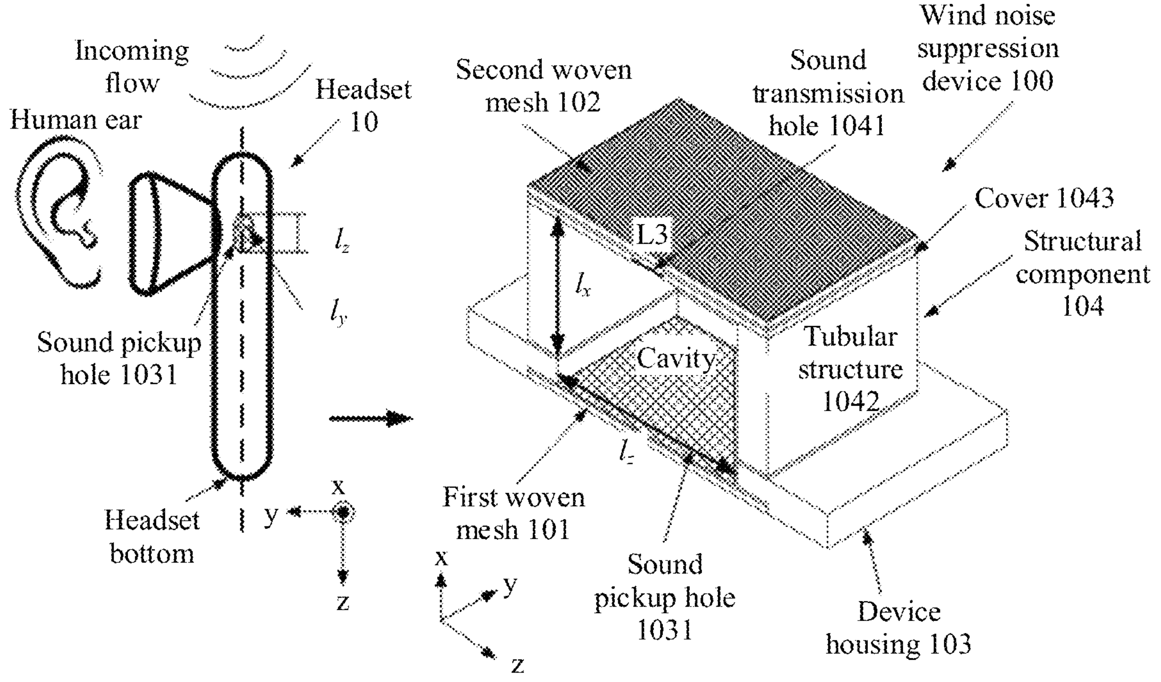
FIG. 1(*a*) and FIG. 1(*b*) are three-dimensional schematic diagrams of a wind noise suppression device according to an embodiment of this application.
Figure 1B:
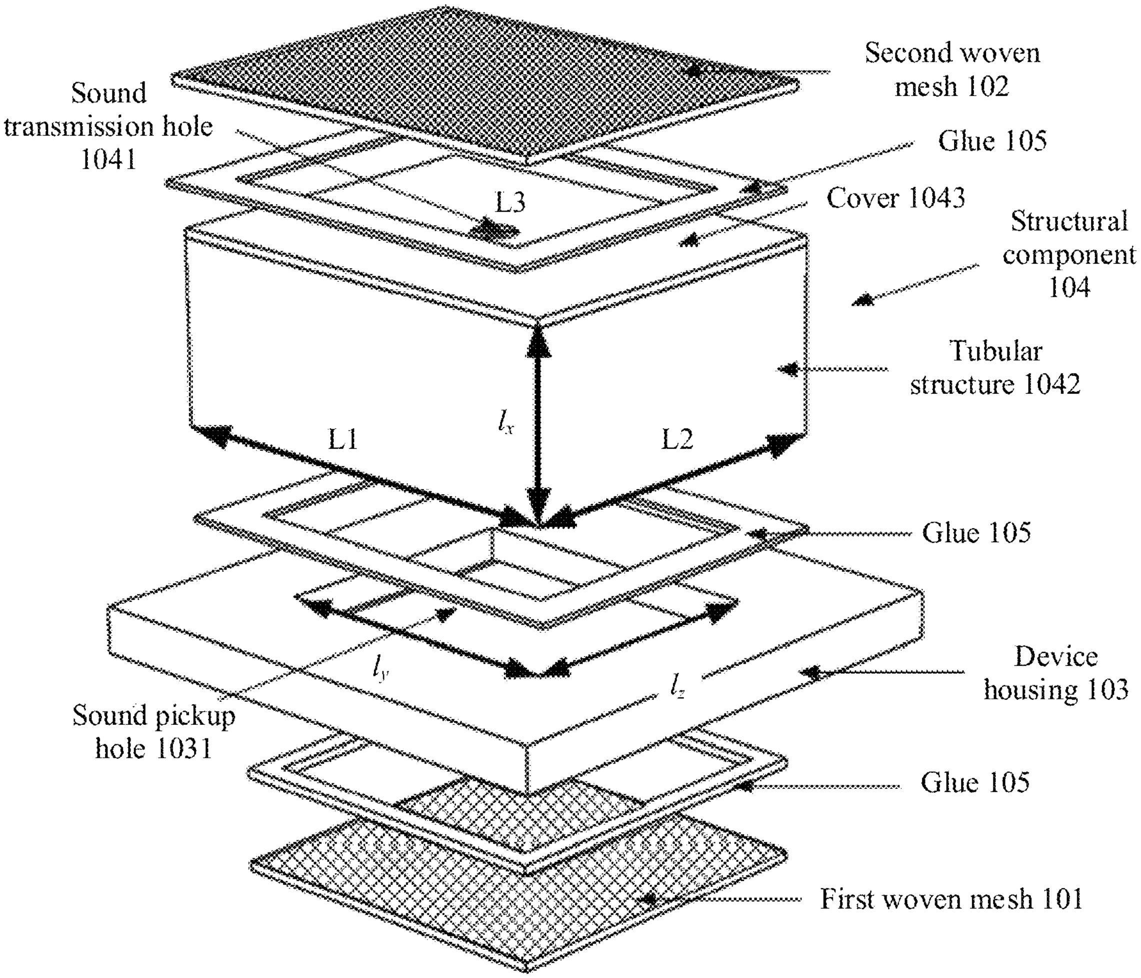

FIG. 1(*a*) and FIG. 1(*b*) are three-dimensional schematic diagrams of a wind noise suppression device according to an embodiment of this application. FIG. 1(*a*) is a partial three-dimensional sectional view of the wind noise suppression device. As shown in FIG. 1(*a*), the wind noise suppression device 100 includes a first woven mesh 101, a second woven mesh 102, a device housing 103, and a structural component 104. The first woven mesh 101, the second woven mesh 102, and the structural component 104 are disposed inside the device housing 103. For ease of understanding, the device housing 103 shown in this embodiment is a part of the device housing of the wind noise suppression device 100. The device housing 103 is provided with a sound pickup hole 1031. The sound pickup hole 1031 is configured to pick up an audio signal, that is, a sound. The first woven mesh 101 covers the sound pickup hole 1031. The structural component 104 is disposed behind the sound pickup hole 1031 (e.g., the structural component is disposed further away from the first woven mesh than the sound pickup). The structural component 104 communicates with the outside through the sound pickup hole 1031. The structural component 104 is provided with a sound transmission hole 1041. The sound transmission hole 1041 is configured to transmit an audio signal in the wind noise suppression device 100 to a microphone connected to the sound transmission hole 1041. The second woven mesh 102 covers the sound transmission hole 1041. It can be understood that the sound pickup hole 1031 is a hollow structure on the device housing 103. The sound transmission hole 1041 is a hollow structure on the structural component 104. In addition, specific shapes of the sound pickup hole 1031 and the sound transmission hole 1041 are not limited in this embodiment. A size of the sound pickup hole 1031 may be greater than a size of the sound transmission hole 1041. In an alternative description, a radial-direction size of the sound pickup hole 1031 is greater than a radial-direction size of the sound transmission hole 1041. A radial direction is a straight-line direction along a diameter or radius.

As shown in FIG. 1(*b*), the structural component 104 in this embodiment includes a tubular structure 1042 with openings at two ends and a cover 1043 located on an opening at one end of the tubular structure. The cover 1043 is provided with the sound transmission hole 1041. FIG. 1(*b*) is merely an example illustrating the structural component 104. A specific shape of the tubular structure 1042 is not limited in this embodiment. For example, the tubular structure 1042 may be a round tubular structure, or may be a square tubular structure.

It can be understood that the structural component 104 is a hollow structure. The structural component 104 is connected to the device housing 103 to form a cavity. Specifically, the first woven mesh 101, the device housing 103, the structural component 104, and the second woven mesh 102 form the cavity. The sound pickup hole 1031 is covered by an orthographic projection that is of an opening at the other end of the tubular structure 1042 and that is on the device housing 103. In an alternative description, the radial-direction size of the sound pickup hole 1031 is less than or equal to a radial-direction size of the hollow structure formed by the structural component 104.

As an example, FIG. 1(*b*) is a three-dimensional schematic exploded view of the wind noise suppression device. As shown in FIG. 1(*b*), the first woven mesh 101, the device housing 103, the structural component 104, and the second woven mesh 102 are sequentially connected (e.g., coupled) together by using a glue 105 (e.g., an adhesive layer, adhering seal, adhering tape). That is, the first woven mesh 101 and the device housing 103 are connected to each other by using the glue 105, the device housing 103 and the structural component 104 are connected to each other by using the glue 105, and the structural component 104 and the second woven mesh 102 are connected to each other by using the glue 105. A shape of the glue 105 is not limited in this embodiment, and a shape of the glue 105 shown in FIG. 1(*b*) is merely an example for description.

Figure 2A:
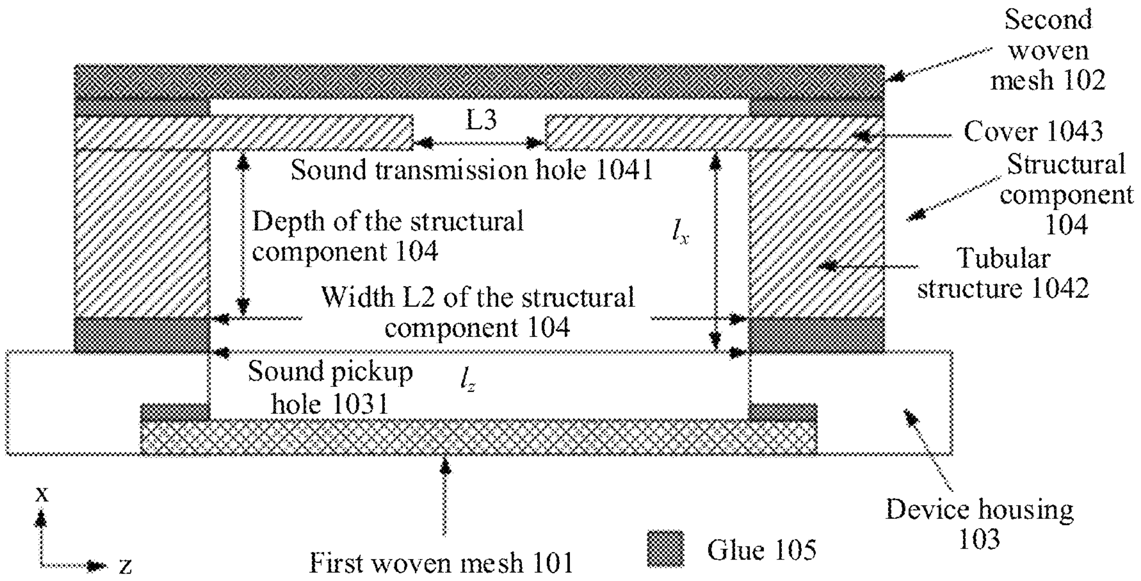
FIG. 2(*a*) to FIG. 2(*c*) are two-dimensional and three-dimensional schematic diagrams of a wind noise suppression device according to an embodiment of this application.
Figure 2B:
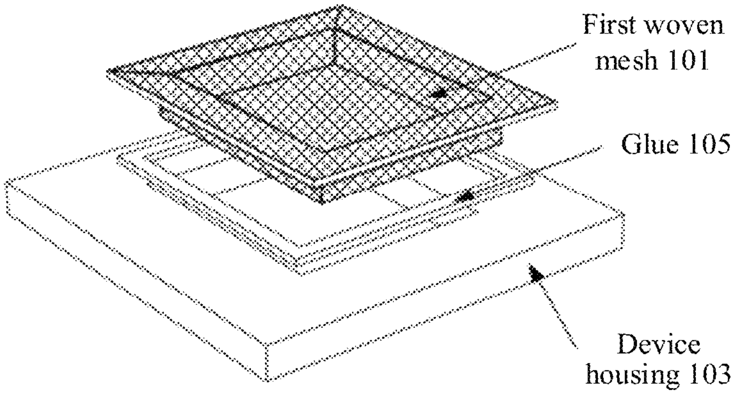
Figure 2C:
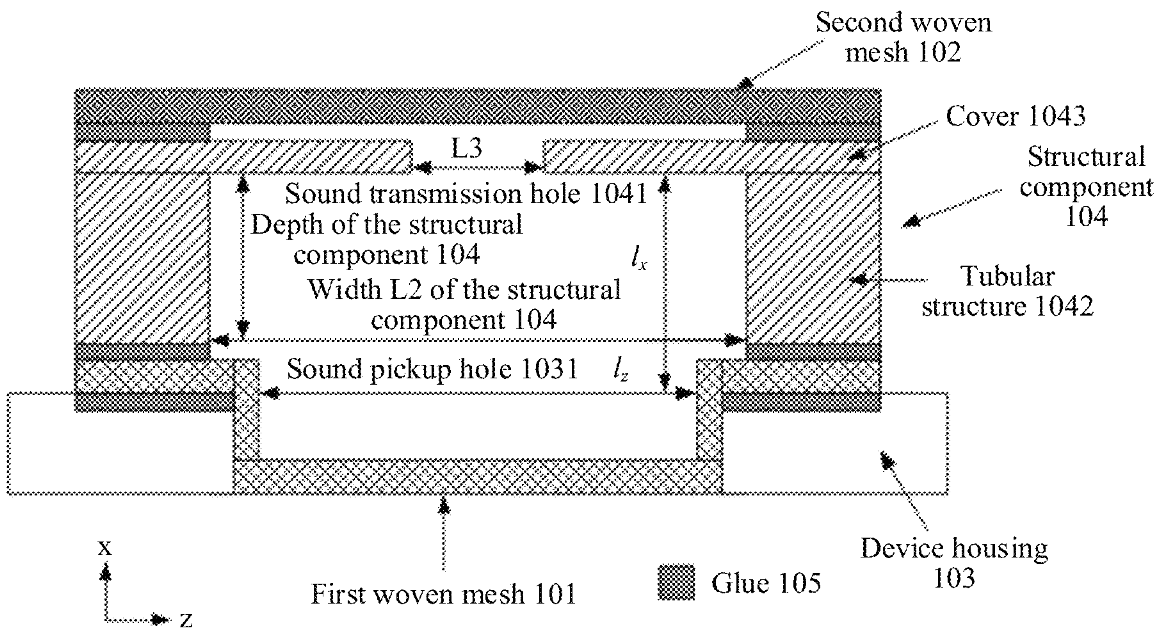

FIG. 2(*a*) is a partial two-dimensional schematic sectional view of the wind noise suppression device. The first woven mesh 101 is disposed at the sound pickup hole 1031 of the device housing 103. For example, the first woven mesh 101 may be bonded to a position of the sound pickup hole 1031 of the device housing 103 by using the glue 105. The first woven mesh 101 is level (e.g., flush, even) with an outer side of the device housing 103, to ensure that a shape of the device housing 103 is not affected by the sound pickup hole (e.g., not protruding). This provides an aesthetic and seamless finish, and also provides an advantage of avoiding an impact of wind noise caused by a shape change (e.g., protruding surfaces) to the device housing 103.

In addition, a mesh structure of the first woven mesh 101 is not limited in this embodiment. As shown in FIG. 2(*a*), the first woven mesh 101 may be a planar mesh structure. FIG. 2(*b*) is a three-dimensional sectional view of the wind noise suppression device. FIG. 2(*c*) is a two-dimensional sectional view of the wind noise suppression device. As shown in FIG. 2(*b*) and FIG. 2(*c*), the first woven mesh 101 may be a strip-shaped mesh structure.

The three-dimensional sectional view of the wind noise suppression device 100 may be obtained by splitting along a dashed line on a headset 10 shown in FIG. 1(*a*). The headset 10 includes the wind noise suppression device 100. In this embodiment, it is assumed that an x direction is a direction from the position of the sound pickup hole 1031 to the inside of the sound pickup hole 1031; a y direction is a flow direction of an airflow, and the y direction may be understood as an incoming direction of the airflow blowing toward the headset 10; and a z direction is a direction pointing to the bottom of the headset. $l_z$ represents a length of the sound pickup hole 1031 in the z direction. $l_y$ represents a length of the sound pickup hole 1031 in a direction perpendicular to the z direction. $l_x$ represents a distance between the sound transmission hole 1041 and a plane in which the sound pickup hole 1031 is located, with a center point of the sound transmission hole 1041 used as a reference point. It can be understood that, if the sound transmission hole 1041 is disposed in the cover 1043 of the structural component 104 (as shown in FIG. 1(*b*)), when a size (e.g., depth) of the glue 105 in the figure is negligible, a depth of the structural component 104 may be approximately equal to the distance between the sound transmission hole 1041 and the plane in which the sound pickup hole 1031 is located. A depth of the structural component 104 and $l_x$ shown in the accompanying drawings in this specification are merely examples for description, and are not limited. Optionally, if the sound transmission hole 1041 is disposed on a side face of the structural component 104, that is, the sound transmission hole 1041 is disposed on the tubular structure 1042 of the structural component 104, a depth of the structural component 104 may be greater than or equal to the distance between the sound transmission hole 1041 and the plane in which the sound pickup hole 1031 is located. The distance between the sound transmission hole 1041 and the plane in which the sound pickup hole 1031 is located is greater than or equal to a preset threshold. The preset threshold is determined based on the size of the sound pickup hole 1031.

For example, as shown in FIG. 1(*b*), L1 represents a length of the structural component 104, and L2 represents a width of the structural component 104. L1 is greater than $l_y$, L2 is greater than $l_z$, and $l_y$ is determined based on $l_y$ and $l_z$. It can be understood that the hollow structure of the structural component 104 needs to completely cover the sound pickup hole 1031. The size L3 of the sound transmission hole 1041 is less than the size $l_z$ of the sound pickup hole 1031. For example, a value range of $l_x$, $l_y$, $l_z$ is 1-30 millimeters (mm), $l_z$ is approximately 4 mm, $l_y$ is approximately 2 mm, and $l_x$ is approximately 6 mm.

As shown in FIG. 2(*a*), a hole size $l_z$ of the sound pickup hole 1031 in the z direction is equal to the width L2 of the cavity of the structural component 104. Optionally, as shown in FIG. 2(*b*) and FIG. 2(*c*), a hole size $l_z$ of the sound pickup hole 1031 in the z direction is less than the width L2 of the cavity of the structural component 104.

A mesh density of the first woven mesh 101 is greater than or equal to 300 meshes, that is, the first woven mesh 101 includes at least 300 meshes. An impedance of the first woven mesh is less than or equal to 200 meter-kilogram-second rayleighs (MKS rayls). The first woven mesh 101 may be a mesh woven from a hard material. For example, the first woven mesh 104 may be a metal mesh.

The second woven mesh 102 is disposed at the sound transmission hole 1041 of the structural component 104. For example, the second woven mesh 102 may be bonded to a position of the sound transmission hole 1041 of the structural component 104 by using glue (e.g., adhesive). The second woven mesh 102 is an acoustic mesh fabric. An impedance of the second woven mesh 102 is greater than or equal to 200 MKS rayls.

A weaving manner of any described woven mesh is not limited in this embodiment. The weaving manner may be a plain weave, a twill weave, or the like.

The device housing 103 and the structural component 104 may be made of any material, which is not limited. For example, the material may be various composite plastic materials.

The first woven mesh 101 is configured to reduce a disturbance of an airflow inside the device caused by an airflow outside the device housing 103 that enters the device through the sound pickup hole 1031, and to reduce a pressure fluctuation of the airflow outside the device housing 103 at the sound pickup hole 1031.

The second woven mesh 102 is configured to reduce an impact of an airflow change in the cavity of the structural component 104 on a diaphragm of the microphone connected to the sound transmission hole 1041, and keep out water and dust (e.g., prevent ingress).

The structural component 104 is configured to propagate an audio signal picked up by the sound pickup hole 1031.

In some embodiments, the woven mesh at the position of the sound pickup hole is used for blocking a flowing airflow from entering the cavity and forming an airflow disturbance, thereby reducing wind noise energy. In addition, because the woven mesh at the sound pickup hole has a rough surface, intensity of pressure fluctuation at the sound pickup hole can be further reduced.

In this embodiment, the tubular structure 1042 that is included in the structural component 104 and that has the openings at the two ends and the cover 1043 located on the opening at one end of the tubular structure may be designed as a whole (e.g., integrally formed), or may be two separate structures (e.g., consisting of components that are coupled to each other).

Figure 3A:
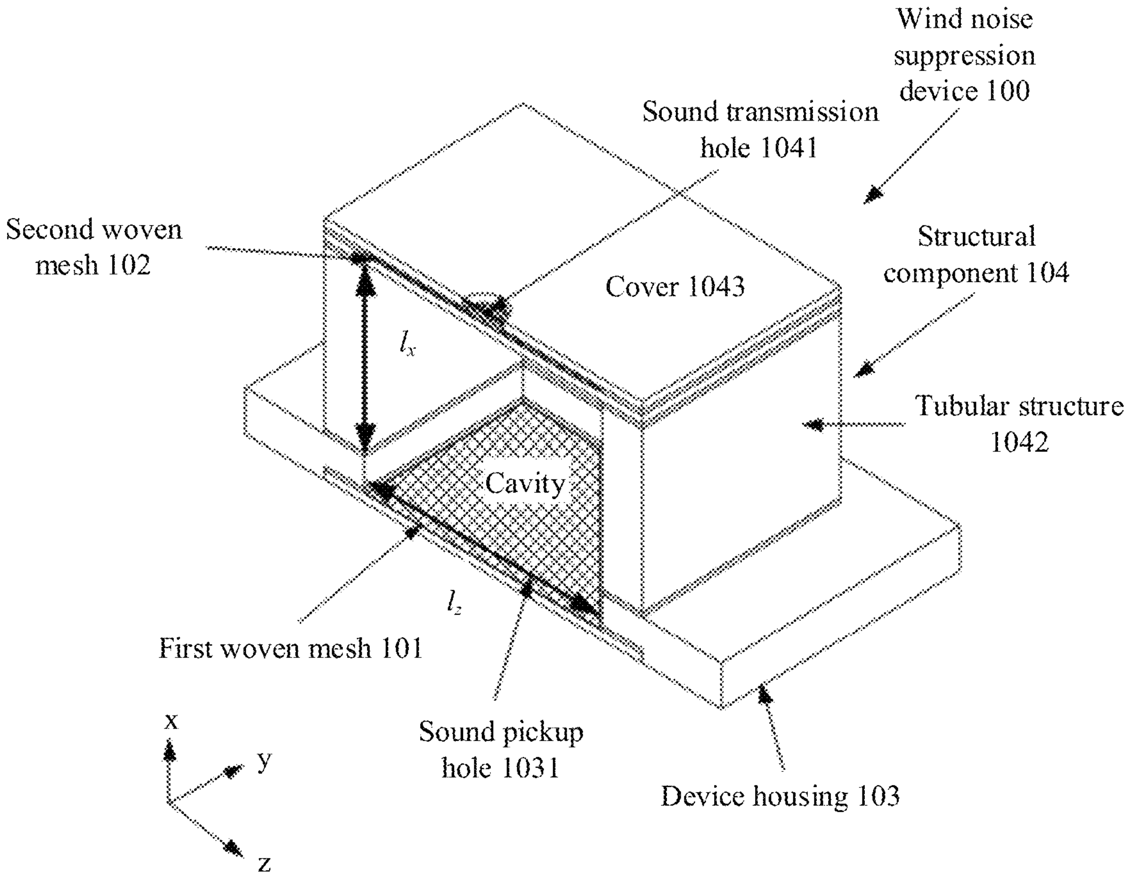
FIG. 3(*a*) and FIG. 3(*b*) are three-dimensional schematic diagrams of a wind noise suppression device according to an embodiment of this application.
Figure 3B:
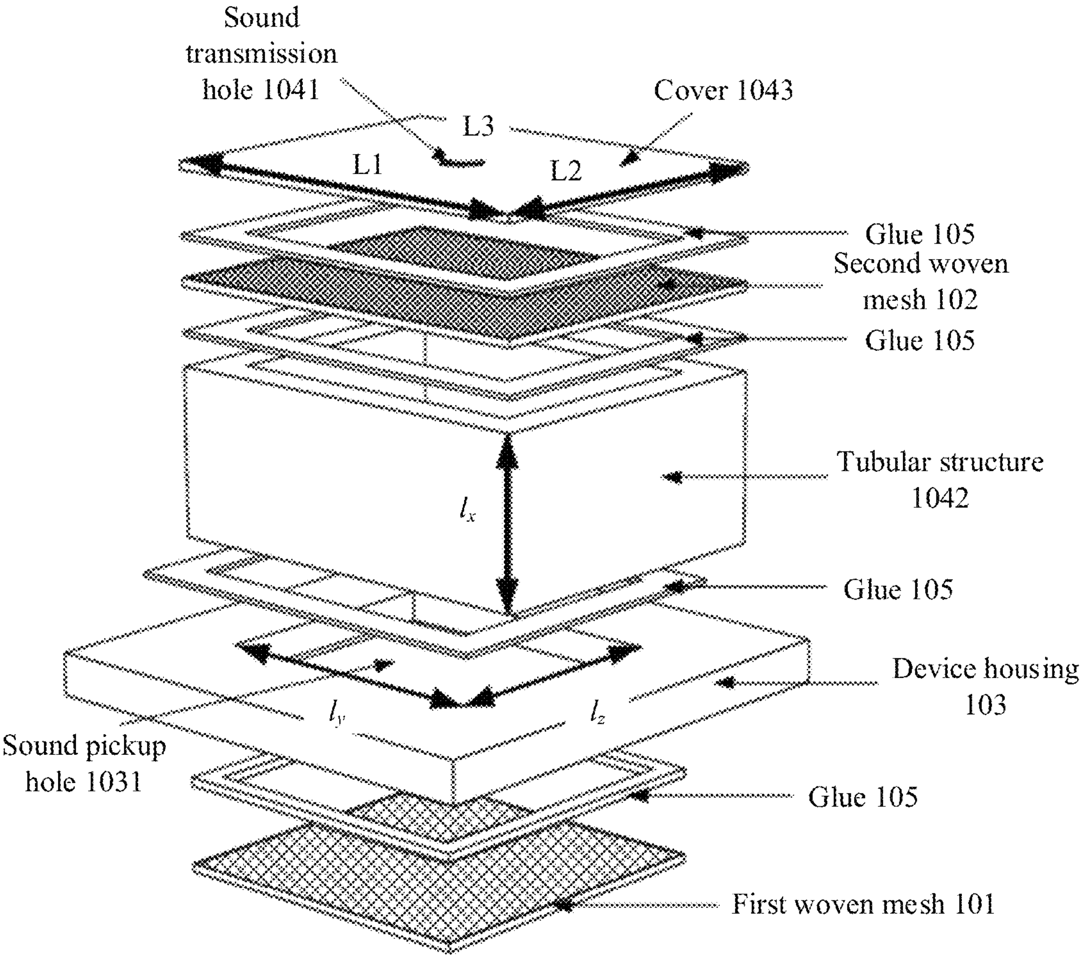
Figure 4:
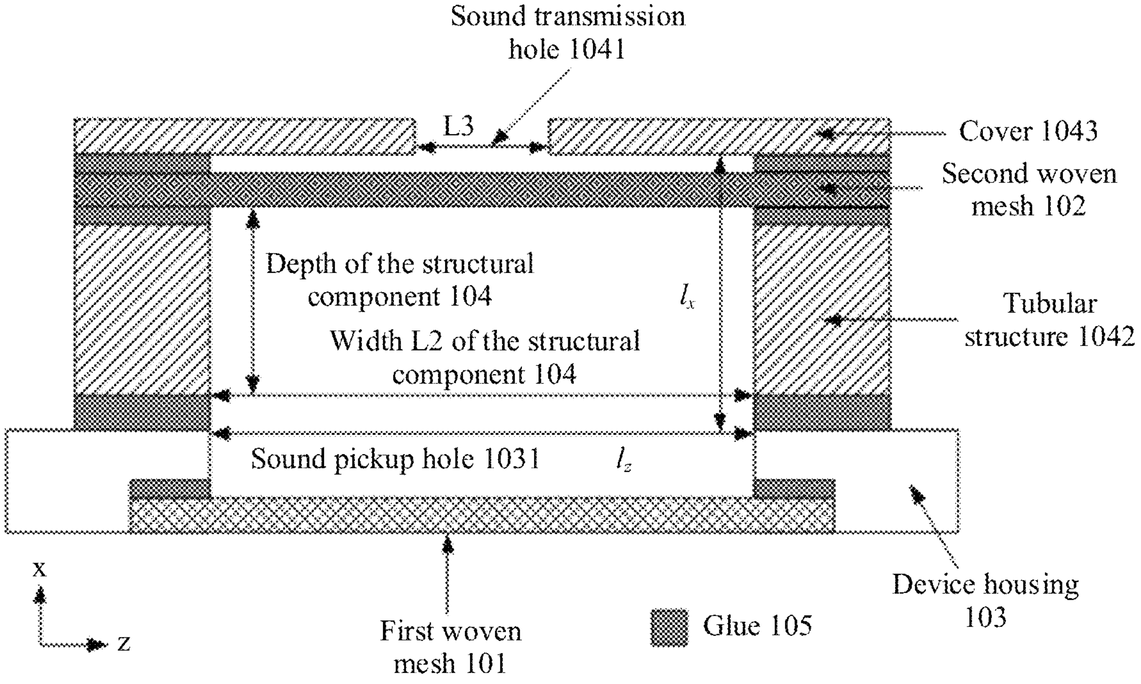
FIG. 4 is a two-dimensional schematic diagram of a wind noise suppression device according to an embodiment of this application.

In some other embodiments, as shown in FIG. 3(*a*) and FIG. 3(*b*), a difference between the wind noise suppression device 100 and that in FIG. 1(*a*) and FIG. 1(*b*) lies in that the second woven mesh 102 is clamped between the tubular structure 1042 and the cover 1043. It can be understood that the first woven mesh 101, the device housing 103, the tubular structure 1042, the second woven mesh 102, and the cover 1043 are sequentially stacked. The second woven mesh 102 is separately connected to the tubular structure 1042 and the cover 1043 by using the glue 105. A hollow structure formed by the cover 1043, the second woven mesh 102, and the tubular structure 1042 communicates with the sound pickup hole 1031. FIG. 4 is a partial two-dimensional sectional view of the wind noise suppression device.

A position of the second woven mesh 102 in the wind noise suppression device 100 is not limited in the embodiments of this application, and the second woven mesh 102 may be alternatively located at another position.

Figure 5A:
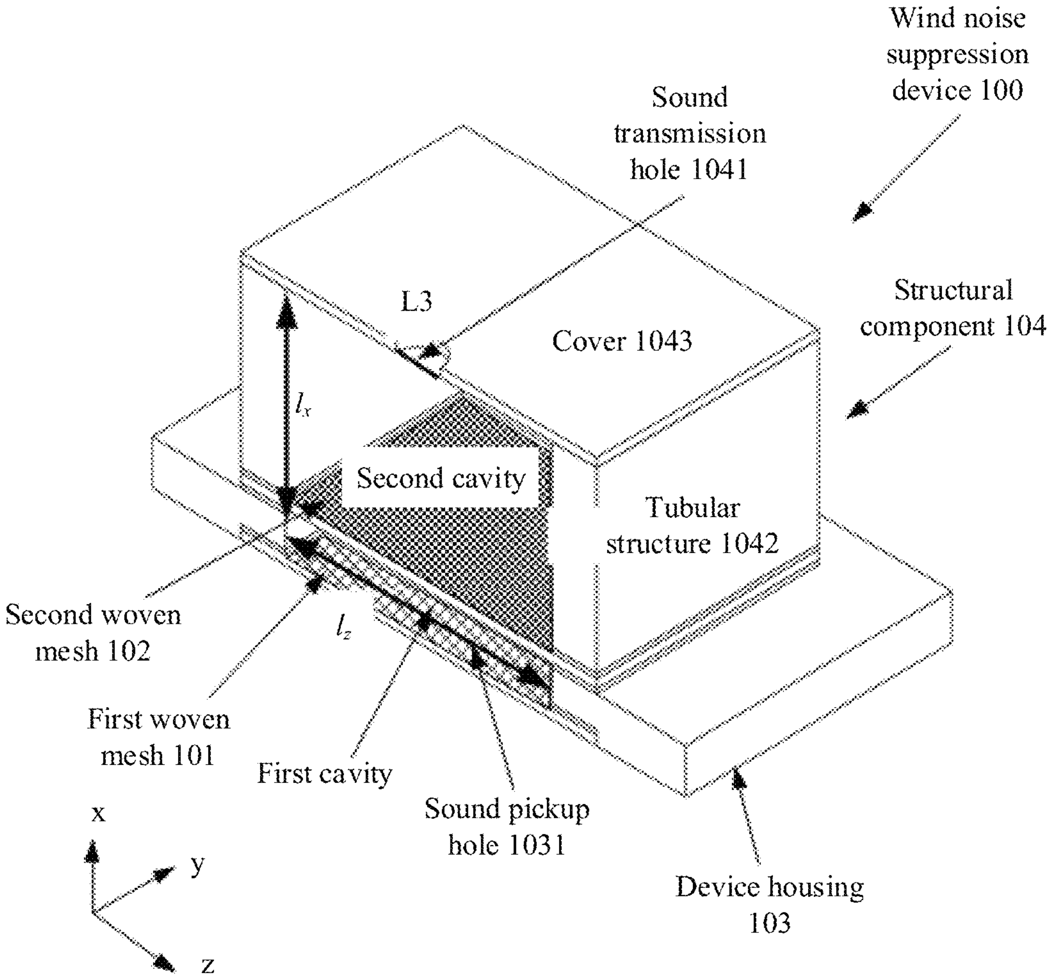
FIG. 5(*a*) and FIG. 5(*b*) are two-dimensional and three-dimensional schematic diagrams of a wind noise suppression device according to an embodiment of this application.
Figure 5B:
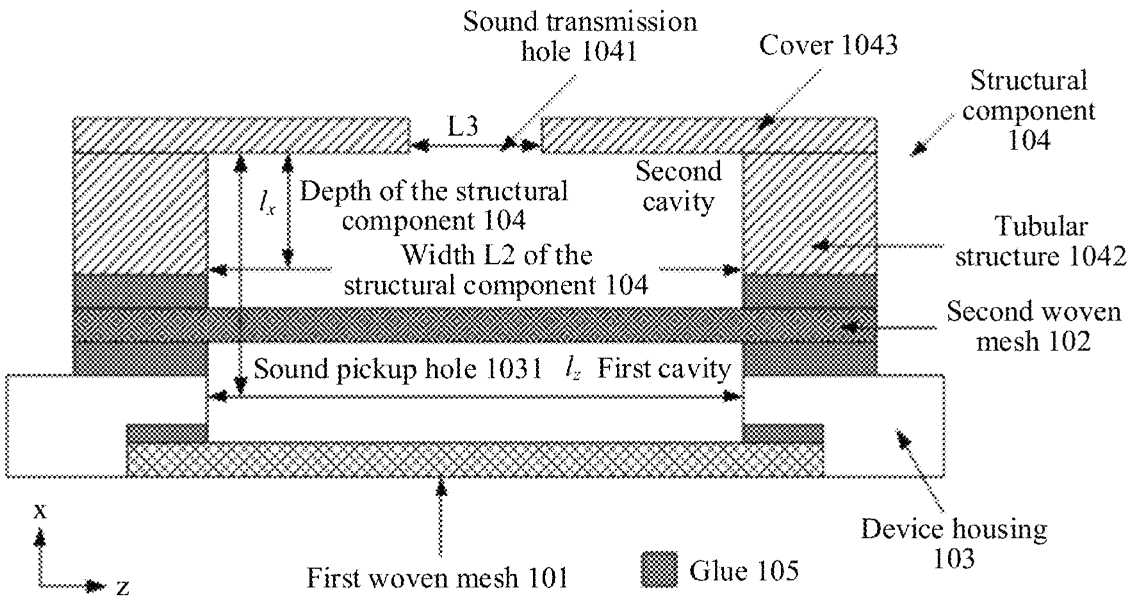

In another possible design, as shown in FIG. 5(*a*), a difference between the wind noise suppression device 100 and that in FIG. 1(*a*), FIG. 1(*b*), and FIG. 2(*a*) to FIG. 2(*c*) lies in that the second woven mesh 102 is clamped between the device housing 103 and the structural component 104. The second woven mesh 102 is separately connected to the device housing 103 and the structural component 104 by using the glue 105. The first woven mesh 101, the second woven mesh 102, and the device housing 103 form a first cavity. The second woven mesh 102 and the structural component 104 form a second cavity. FIG. 5(*b*) is a two-dimensional sectional view of the wind noise suppression device. The first cavity and the second cavity in this embodiment constitute the cavity formed by connecting the structural component to the device housing in the claims.

Figure 6A:
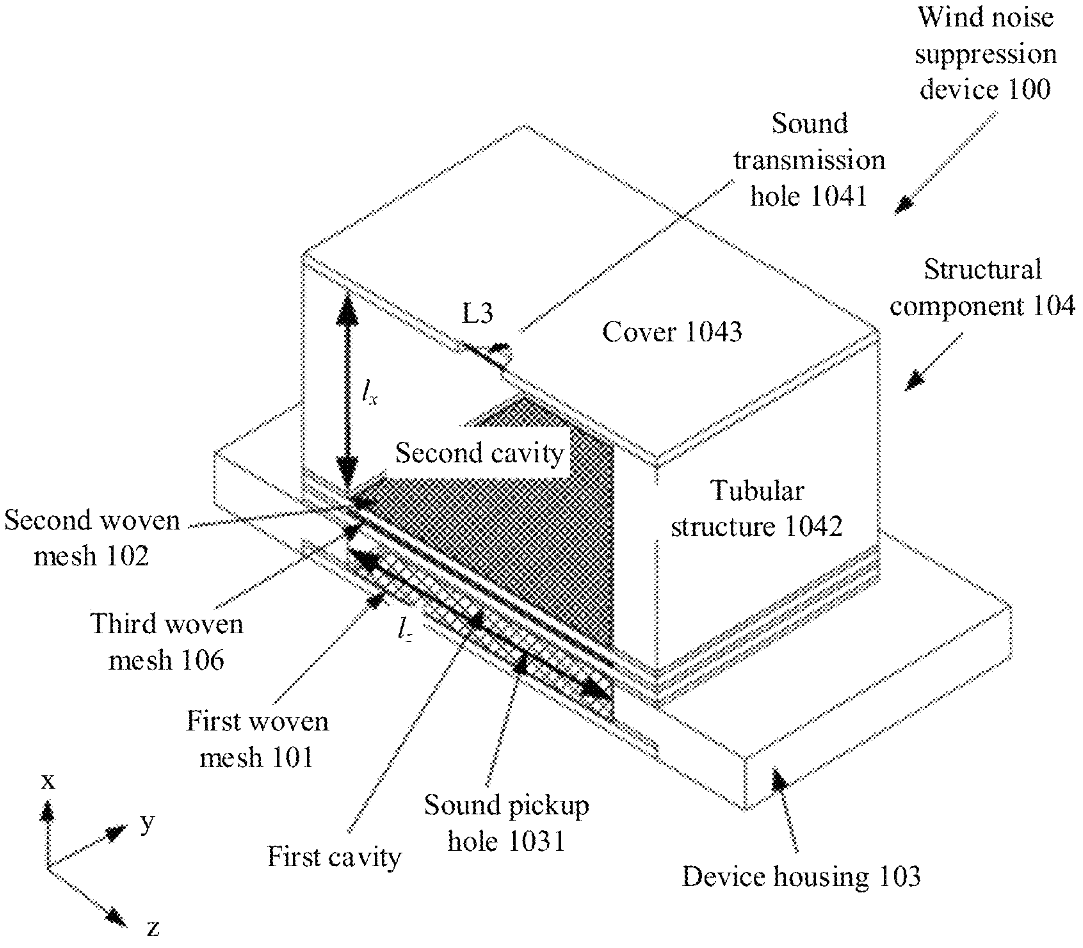
FIG. 6(*a*) and FIG. 6(*b*) are three-dimensional schematic diagrams of a wind noise suppression device according to an embodiment of this application.
Figure 6B:
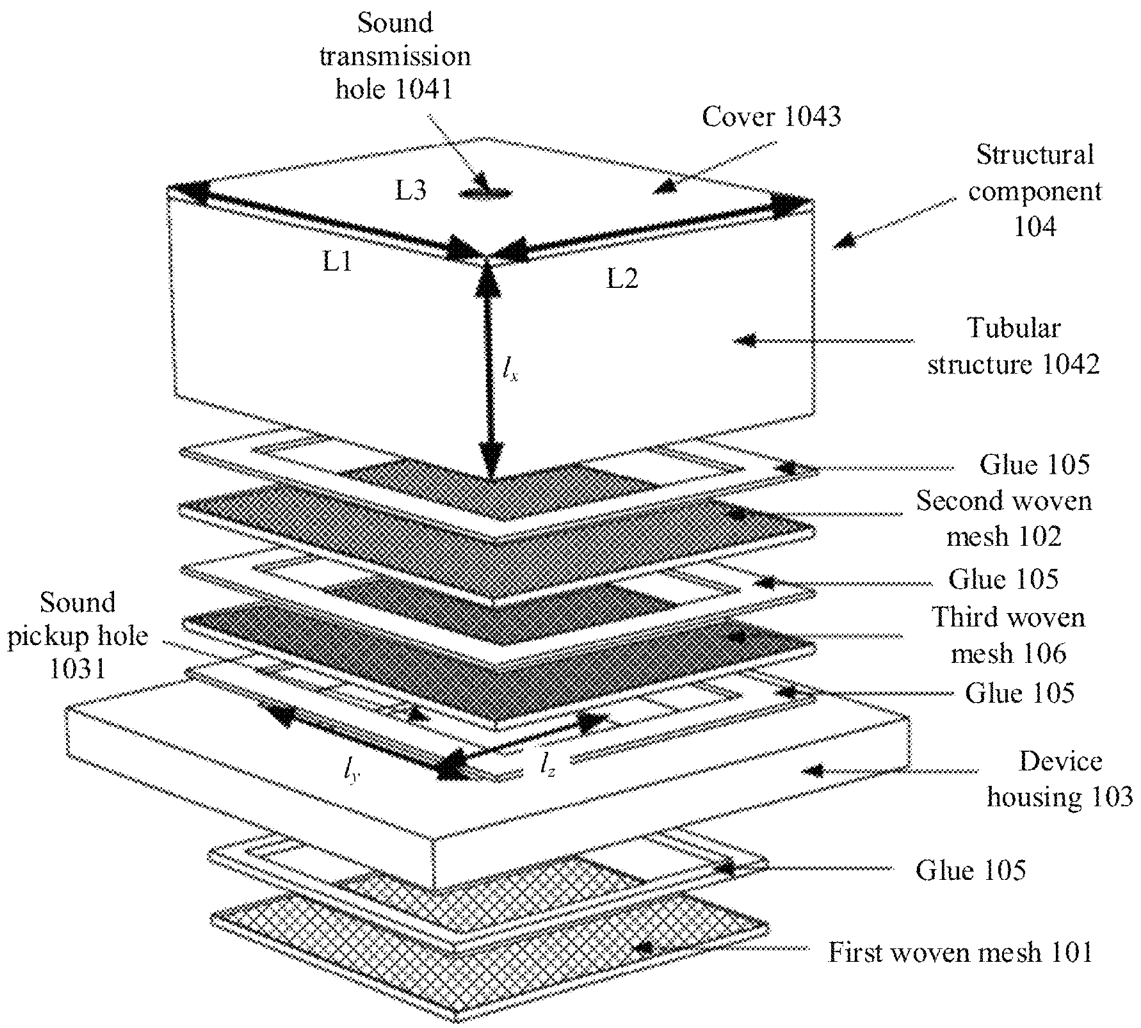
Figure 7:
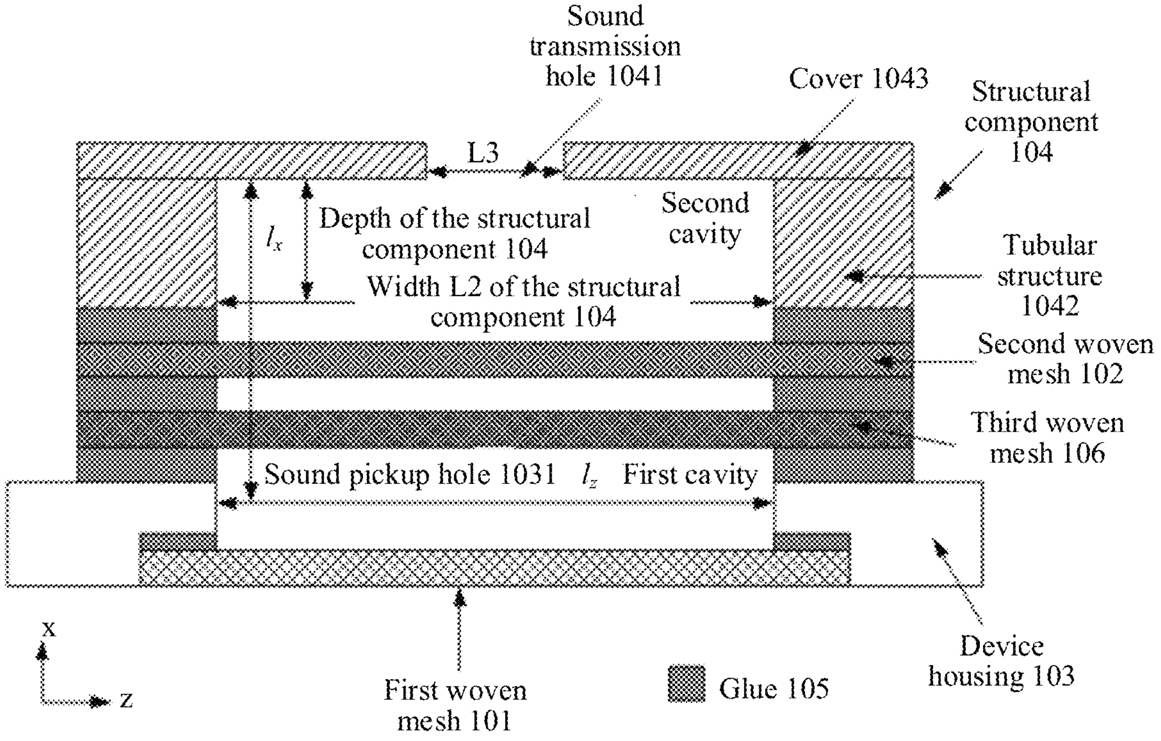
FIG. 7 is a two-dimensional schematic diagram of a wind noise suppression device according to an embodiment of this application.

In another possible design, if a mesh density of the first woven mesh 101 is comparatively low (for example, the mesh density of the first woven mesh 101 is less than 300 meshes), that is, the first woven mesh 101 includes a comparatively small quantity of meshes, a woven mesh may be further added to the wind noise suppression device. This arrangement further reduces disturbance of an airflow inside the device caused by an airflow outside the device housing that enters the device through the sound pickup hole 1031. As shown in FIG. 6(*a*) and FIG. 6(*b*), a difference between the wind noise suppression device 100 and that in FIG. 5(*a*) lies in that the wind noise suppression device 100 further includes a third woven mesh 106. The third woven mesh 106 is clamped between the device housing 103 and the second woven mesh 102. The third woven mesh 106 is separately connected to the device housing 103 and the second woven mesh 102 by using the glue 105. For example, the third woven mesh 106 may be bonded to the device housing 103 by using the glue 105, and bonded to the second woven mesh 102 by using the glue 105. The second woven mesh 102 may be bonded to the tubular structure 1042 by using the glue 105, and bonded to the third woven mesh 106 by using the glue 105. The first woven mesh 101, the device housing 103, the third woven mesh 106, the second woven mesh 102, and the structural component 104 are sequentially stacked. The first woven mesh 101, the device housing 103, the third woven mesh 106, and the second woven mesh 102 form a first cavity. The third woven mesh 106, the second woven mesh 102, and the structural component 104 form a second cavity. FIG. 7 is a two-dimensional sectional view of the wind noise suppression device.

Figure 8A:
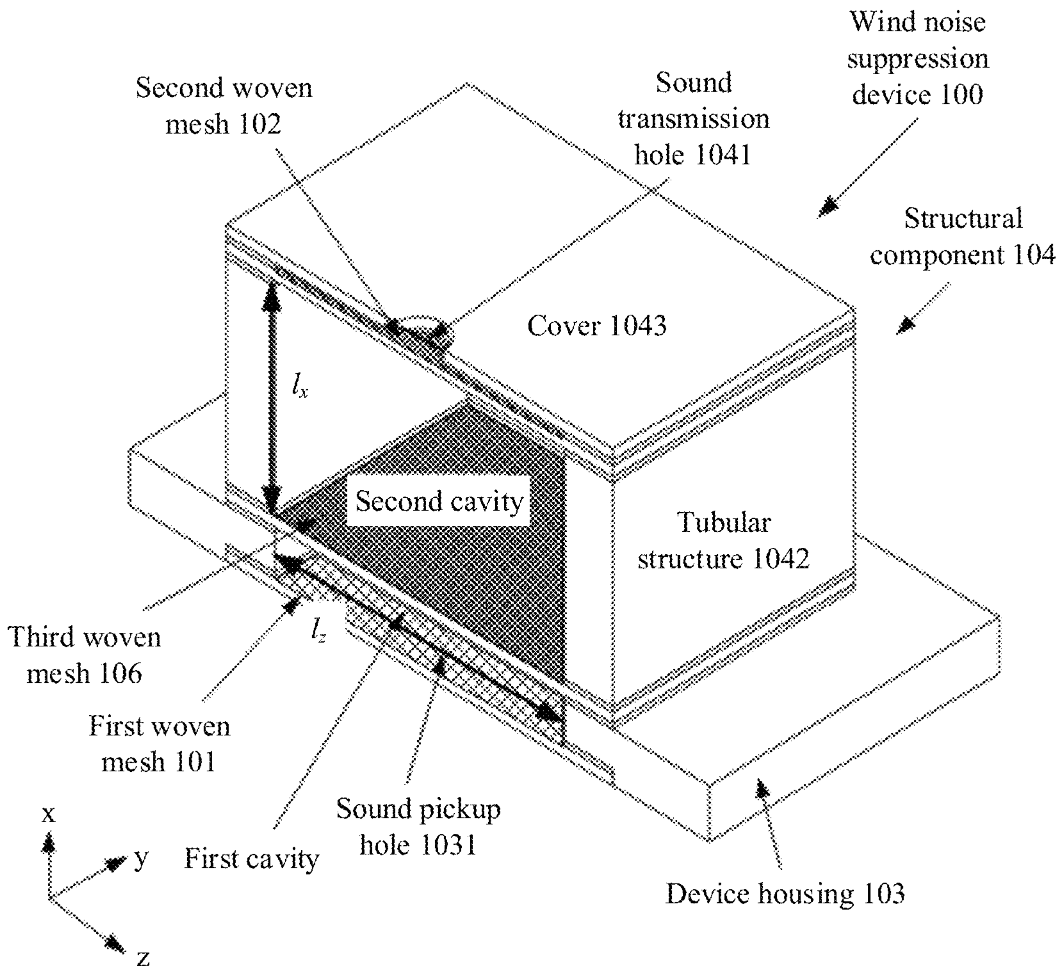
FIG. 8(*a*) and FIG. 8(*b*) are two-dimensional and three-dimensional schematic diagrams of a wind noise suppression device according to an embodiment of this application.
Figure 8B:
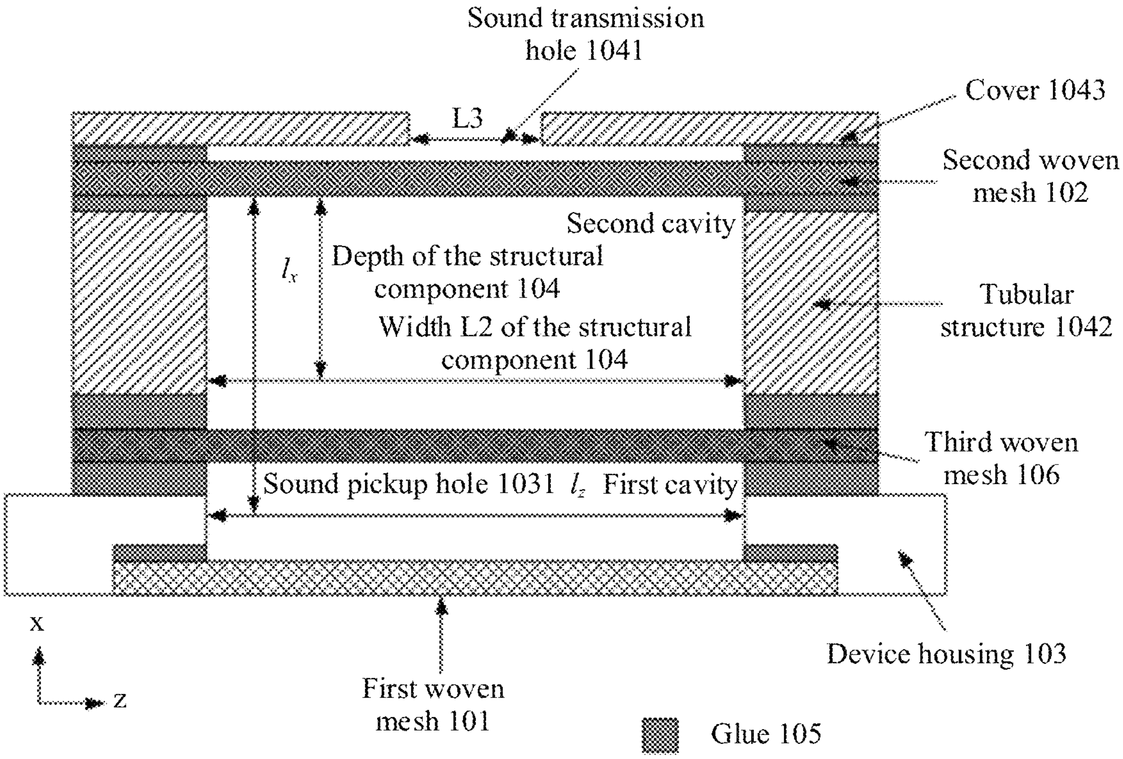

In another possible design, as shown in FIG. 8(*a*), a difference between the wind noise suppression device 100 and that in FIG. 6(*a*), FIG. 6(*b*), and FIG. 7 lies in that the second woven mesh 102 is clamped between the tubular structure 1042 and the cover 1043, and the third woven mesh 106 is clamped between the device housing 103 and the tubular structure 1042. For example, the second woven mesh 102 is bonded to the tubular structure 1042 and the cover 1043 by using the glue 105. The third woven mesh 106 may be bonded to the device housing 103 and the tubular structure 1042 by using the glue 105. The first woven mesh 101, the device housing 103, the third woven mesh 106, the tubular structure 1042, the second woven mesh 102, and the cover 1043 are sequentially stacked. The first woven mesh 101, the third woven mesh 106, and the device housing 103 form a first cavity. The second woven mesh 102, the third woven mesh 106, the tubular structure 1042, and the cover 1043 form a second cavity. FIG. 8(*b*) is a two-dimensional sectional view of the wind noise suppression device.

In another possible design, the tubular structure 1042 that is included in the structural component 104 and that has the openings at the two ends and the cover 1043 located on the opening at one end of the tubular structure may be designed as a whole (e.g., integrally formed). The second woven mesh 102 covers the sound transmission hole 1041. The third woven mesh 106 is clamped between the device housing 103 and the tubular structure 1042. The third woven mesh 106 may be bonded to the device housing 103 by using the glue 105, and bonded to the tubular structure 1042 by using the glue 105.

The mesh density of the first woven mesh 101 is less than or equal to a mesh density of the third woven mesh 106. For example, the mesh density of the first woven mesh 101 is less than or equal to 1000 meshes, and the mesh density of the third woven mesh 106 is less than or equal to 1000 meshes.

In addition, material hardness of the third woven mesh 106 is less than material hardness of the first woven mesh 101. The third woven mesh 106 may also be a metal mesh.

A volume of the structural component 104 in this embodiment is less than 1 cubic centimeter. In this way, the structural component 104, the first woven mesh 101, the second woven mesh 102, and the third woven mesh 106 can be disposed in the miniaturized wind noise suppression device, to suppress wind noise.

A main source of wind noise is related to vortex shedding and vortex impact on a headset structure surface. Main sources of a vortex include atmospheric turbulence in a wind, an unstable flow caused by face curvature, flow disturbance caused by an auricle, a head, or the like, and the like. Based on a characteristic that a wave number of pressure fluctuation caused by a vortex is comparatively large, a large-sized sound pickup hole and cavity structure may be used for reducing propagation of wind noise energy inside a headset cavity, and for reducing wind noise energy at a sound transmission hole.

Figure 9:
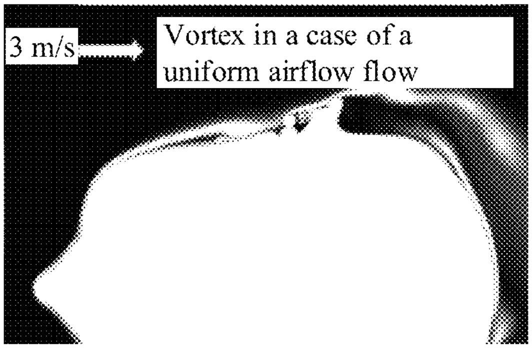
FIG. 9 is a schematic diagram of a vortex according to an embodiment of this application.
Figure 9:
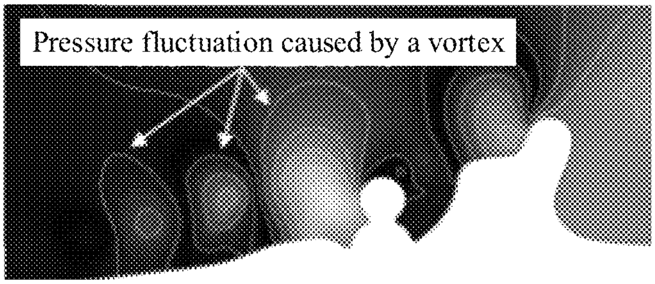

(a) in FIG. 9 is a schematic diagram of a vortex near a head in a case of a uniform airflow flow (e.g., laminar flow). (b) in FIG. 9 is a schematic diagram of a vortex near a head in a case of a non-uniform airflow flow (e.g., turbulent flow). A non-uniform airflow may be generated when the airflow collides with an object such as a face, a headset, or an auricle. When a non-uniform airflow collides with an object such as a face, a headset, or an auricle, pressure fluctuation may be formed, thereby generating wind noise.

Figure 10:
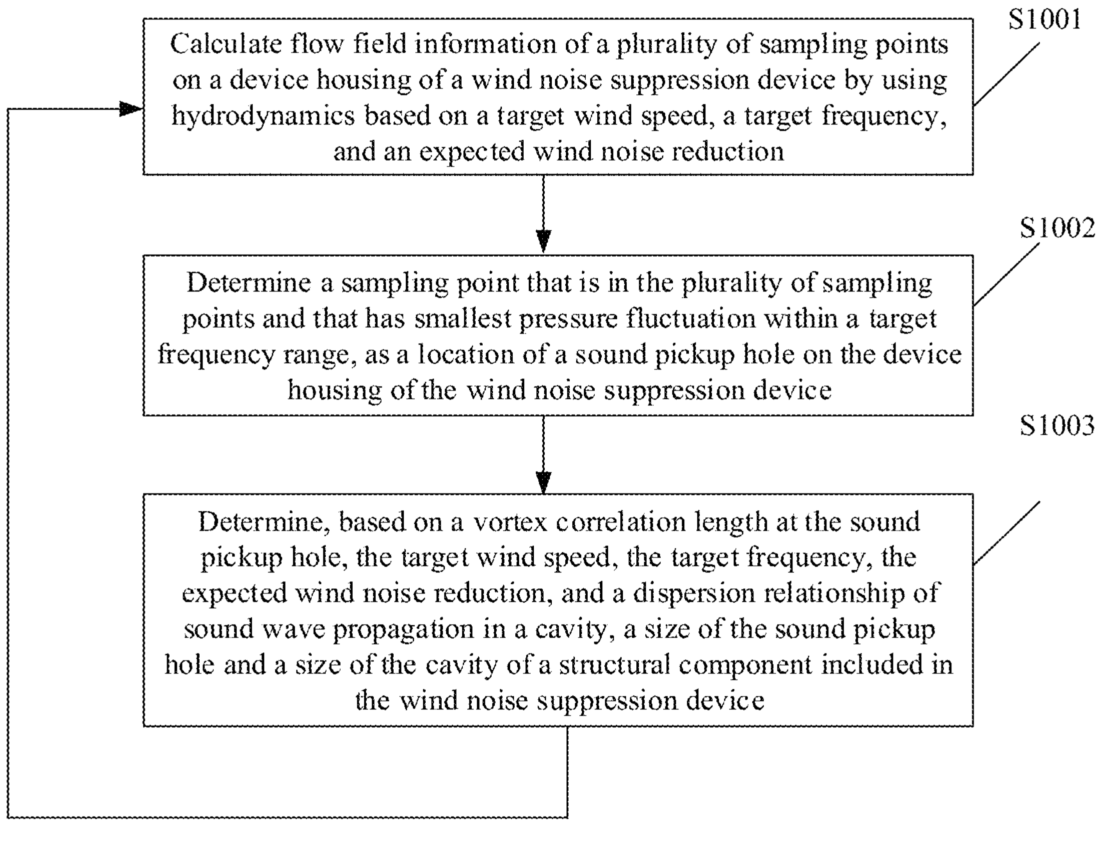
FIG. 10 is a flowchart of a method for designing a wind noise suppression device according to an embodiment of this application.

An embodiment of this application further provides a method for designing a wind noise suppression device. A size of a sound pickup hole of the wind noise suppression device and a size of a cavity of the wind noise suppression device are designed, optimized, and adjusted based on a target wind speed, a target frequency, expected wind noise reduction, and flow field information near the wind noise suppression device to suppress wind noise by using an appearance (e.g., a similar geometric shape and design) of the wind noise suppression device and a structural characteristic of the wind noise suppression device, and reduce, as much as possible, wind noise entering a human ear. The target wind speed represents a speed of an airflow that forms wind noise. A range of the target wind speed is less than or equal to 10 m/s. In this embodiment, it is assumed that the target wind speed is 3 m/s. The target frequency represents a frequency of an airflow that forms wind noise. A target frequency range represents a frequency range of wind noise that may be output by a device and to which a human ear is sensitive. In this embodiment, it is assumed that the target frequency range is 100 Hertz (Hz) to 1000 Hertz. The expected wind noise reduction represents an amount by which energy of wind noise is reduced from the sound pickup hole to a sound transmission hole. The expected wind noise reduction may be 3 dB. Herein, it is assumed that the wind noise suppression device may be the wind noise suppression device 100 in any one of the foregoing embodiments, and the wind noise suppression device may be a headset. As shown in FIG. 10, the method includes the following steps.

S1001: Calculate flow field information of a plurality of sampling points on a device housing of the wind noise suppression device by using hydrodynamics based on the target wind speed, the target frequency, and the expected wind noise reduction.

Figure 11:
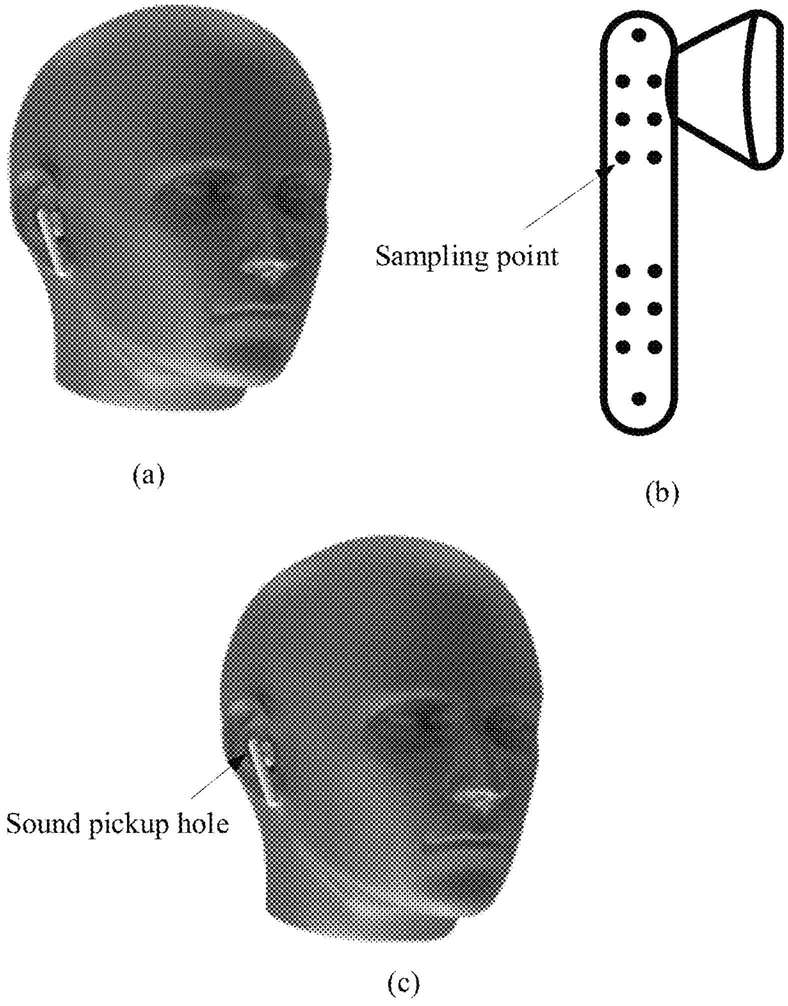
FIG. 11 is a schematic diagram of a headset according to this application.

A three-dimensional model of wearing the headset by a user may be designed in advance, to simulate a case in which the user is in an environment with a flowing airflow. (a) in FIG. 11 is a schematic diagram of a three-dimensional model of wearing a headset by a user. (b) in FIG. 11 shows a headset on which a plurality of sampling points are disposed. Flow field information of the plurality of sampling points on the headset is calculated by using hydrodynamics. The flow field information includes time-varying speed, density, and pressure fluctuations. Wind noise is a time-varying pressure fluctuation of an airflow at the sampling point.

S1002: Determine a sampling point that is in the plurality of sampling points and that has smallest pressure fluctuation within the target frequency range, as a position of the sound pickup hole on the device housing of the wind noise suppression device.

It can be learned through testing that, in a case of a headset design shown as an example in (c) in FIG. 11, an appearance of the design of the headset is not changed, and that the sound pickup hole is disposed at a headset rear position close to an auricle, for example, a position indicated by an arrow in (c) in FIG. 11, so that pressure fluctuation that is generated due to vortex impact and that is received by a microphone can be effectively reduced. In other words, wind noise energy at the sound transmission hole of the microphone can be reduced. For example, when the sound pickup hole is located at a position that an included angle between an incoming flow and a head axis is zero, wind noise suppression effect is strongest.

Further, an area of the sound pickup hole may be increased, so that pressure fluctuation is canceled in a comparatively large area, thereby achieving better wind noise suppression effect. Step S1003 is performed.

S1003: Determine, based on a vortex correlation length at the sound pickup hole, the target wind speed, the target frequency, the expected wind noise reduction, and a dispersion relationship of sound wave propagation in the cavity, the size of the sound pickup hole and the size of the cavity of a structural component included in the wind noise suppression device.

A size of the structural component includes a depth of the structural component. The size of the sound pickup hole includes a length $l_z$ of the sound pickup hole in a z direction and a length $l_y$ of the sound pickup hole in a direction perpendicular to the z direction. It is assumed that the target frequency is selected as $f_1$, the target wind speed is U, and an airflow direction is a direction toward a human face. An equivalent wavelength in a vortex state is $l_y=U/f_1$. Due to a space limitation caused by a stacking of internal elements, it is assumed that a length of the sound pickup hole in a y direction (as shown in FIG. 1(*a*)) is $l_y$, and an equivalent wave number in the y direction is $$k_y = 2\pi\frac{l_y}{\lambda_y}.$$

The dispersion relationship of sound wave propagation in the cavity satisfies a formula (1):

$$k_x^2 + k_y^2 + k_z^2 = k^2 = \left(\frac{\omega_1}{c}\right)^2 \quad (1)$$

Herein, c represents a sound speed, $\omega_1=2\pi f_1$, $k_x$ represents an equivalent wave number in an x direction, $k_z$ represents an equivalent wave number in the z direction, and $k_y$ represents an equivalent wave number in the y direction. To ensure that surface pressure fluctuation of the device housing cannot be effectively propagated into the cavity, $k_x^2<0$. A formula (2) may be obtained from the formula (1):

$$k_z^2 > \left(\frac{\omega_1}{c}\right)^2 - k_y^2 \quad (2)$$

Figure 12:
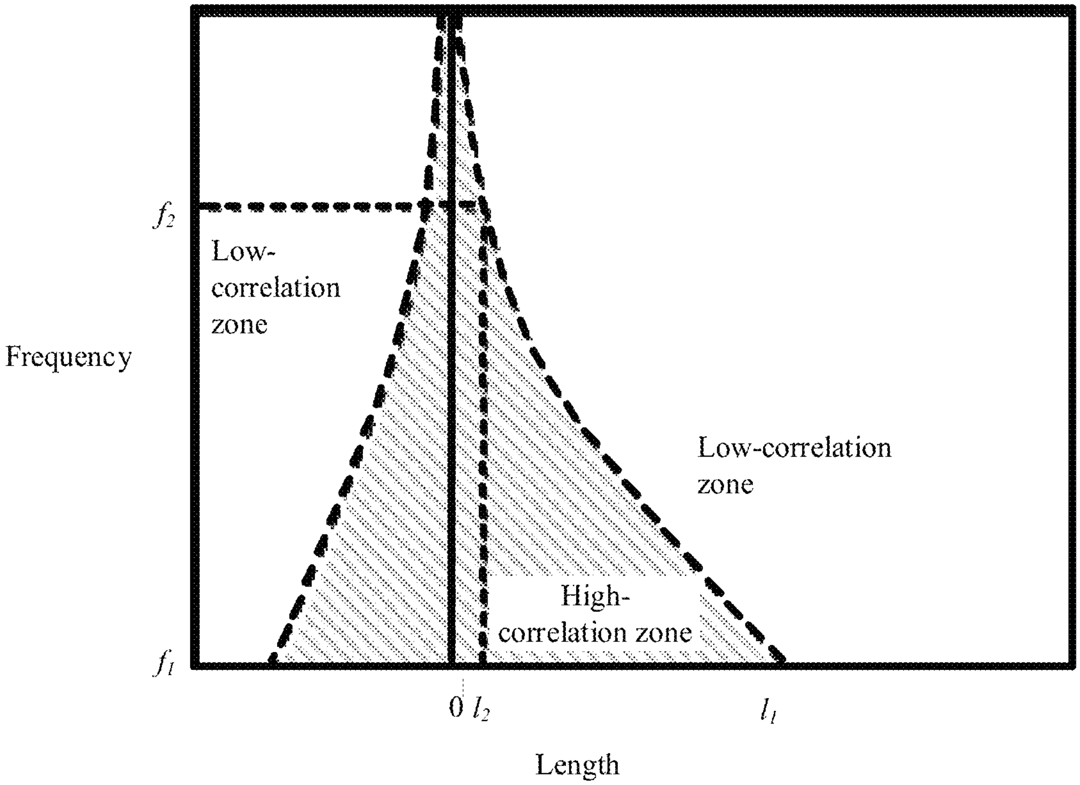
FIG. 12 is a schematic diagram of a vortex correlation according to this application.

It can be learned from FIG. 12 that, at the target frequency $f_1$, a boundary between a high correlation and a low correlation in a positive direction of the z direction is approximately $l_1$. In addition, it can be learned from a flow analysis that interference between the sound pickup hole and an end flow is easily caused in a −z direction (e.g., a direction opposite to the z direction). Therefore, a wavelength of a vortex in the z direction at $f_1$ may be approximately $l_1$. It can be learned that a hole distance $l_z$ of the sound pickup hole in the z direction meets (3):

$$l_z > \sqrt{\left(\frac{\omega_1}{c}\right)^2 - k_y^2} \cdot \frac{l_1}{2\pi} \tag{3}$$

It is assumed that the length that is of the sound pickup hole in the z direction and that meets a requirement is selected as $l_z$, and the length that is of the sound pickup hole in the y direction and that meets a requirement is $l_y$. A size L1 of the internal cavity in the y direction should not be less than the size $l_y$ of the sound pickup hole, and a size L2 of the internal cavity in the z direction should not be less than the size $l_z$ of the sound pickup hole. If the expected wind noise reduction is 3 dB at $f_2$, that is, wind noise energy is reduced by 50%, a formula (4) needs to be met in the x direction of the cavity:

$$k_x l_x > -\ln(\sqrt{(0.5)}) \tag{4}$$

At the target wind speed U, a corresponding vortex correlation demarcation length at the target frequency $f_2$ is $l_2$. In this case, $k_x$ satisfies a formula (5):

$$k_x = \sqrt{\left(\frac{\omega_2}{c}\right)^2 - \left(2\pi\frac{l_y f_2}{U}\right)^2 - \left(2\pi\frac{l_z}{l_2}\right)^2} \tag{5}$$

In this way, a distance $l_x$ between the sound transmission hole 1041 and a plane in which the sound pickup hole 1031 is located can be calculated, to obtain a depth of the cavity of the structural component. The depth of the cavity of the structural component is greater than or equal to $l_x$.

A size of the structural component included in the wind noise suppression device is greater than or equal to the size of the sound pickup hole. The size of the structural component includes a length, width, and depth of the structural component.

If at least one of the size of the sound pickup hole and the size of the structural component that are obtained through calculation are greater than a space in the wind noise suppression device, a device design, an internal space arrangement, and parameters such as the target frequency and the expected wind noise reduction may be adjusted anew, and S1001 to S1003 may be reperformed.

In this way, the area of the sound pickup hole is increased by using correlation lengths of a vortex at different frequencies in the z direction perpendicular to an incoming flow direction, so that pressure fluctuation is canceled in a comparatively large area, thereby achieving better wind noise suppression effect. In this embodiment, wind noise is suppressed by improving and optimizing a semi-open headset structure design.

Figure 13:
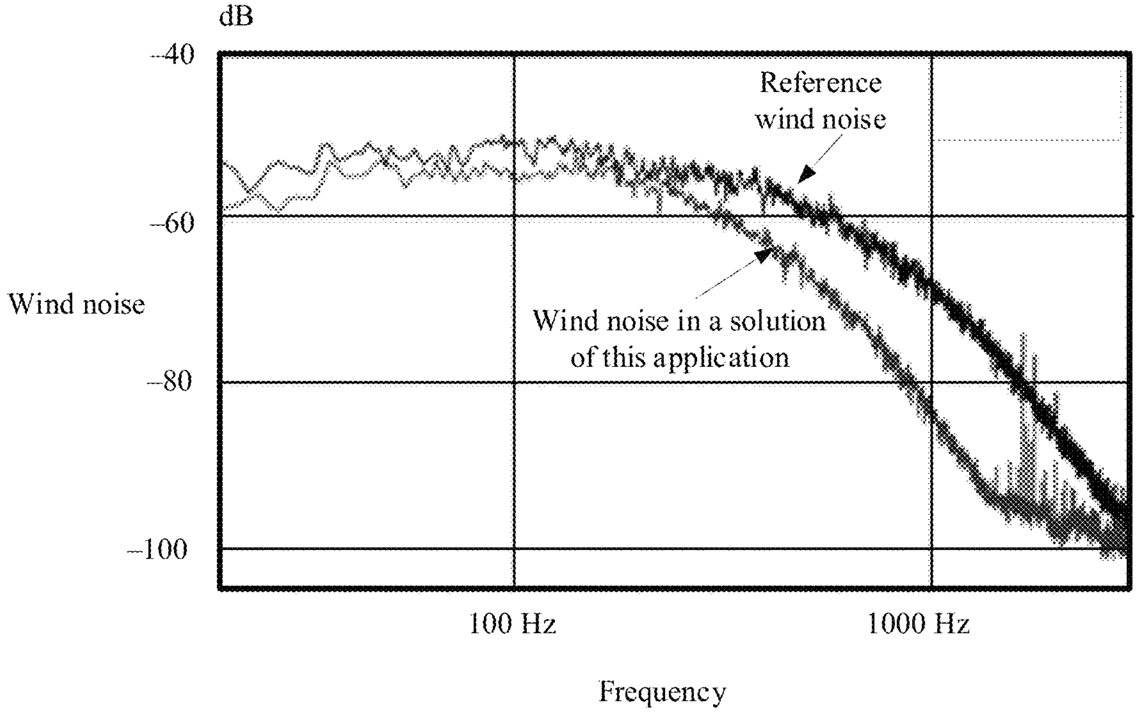
FIG. 13 is a schematic diagram of a wind noise reduction effect of wind noise suppression of a headset according to an embodiment of this application.

FIG. 13 is a schematic diagram of a wind noise reduction effect of wind noise suppression of a headset according to an embodiment of this application. A horizontal axis represents a frequency, and a vertical axis represents a wind noise sound pressure level (SPL) or wind noise. It can be learned from the figure that, compared with a conventional headset, the headset provided in some embodiments have a comparatively large wind noise reduction of wind noise suppression in the target frequency range of 100 Hz to 1000 Hz, a wind noise reduction frequency range may reach 3000 Hz, and a wind noise reduction may reach 10 dB.

Therefore, the sound pickup hole of the headset is enlarged, and the structural component and the woven mesh are installed in the headset, so that pressure fluctuation generated by vortex structure shear and impact can be effectively reduced on a basis of preventing a gust, thereby reducing wind noise of the headset in the target frequency range, and improving audio quality and an application scope of the product. In addition, for achieving a same wind noise reduction, a smaller structural space may be achieved. For the same structural space, the headset provided in the embodiments of this application have a higher applicability to be utilized in devices and results in a larger wind noise reduction.

Figure 14A:
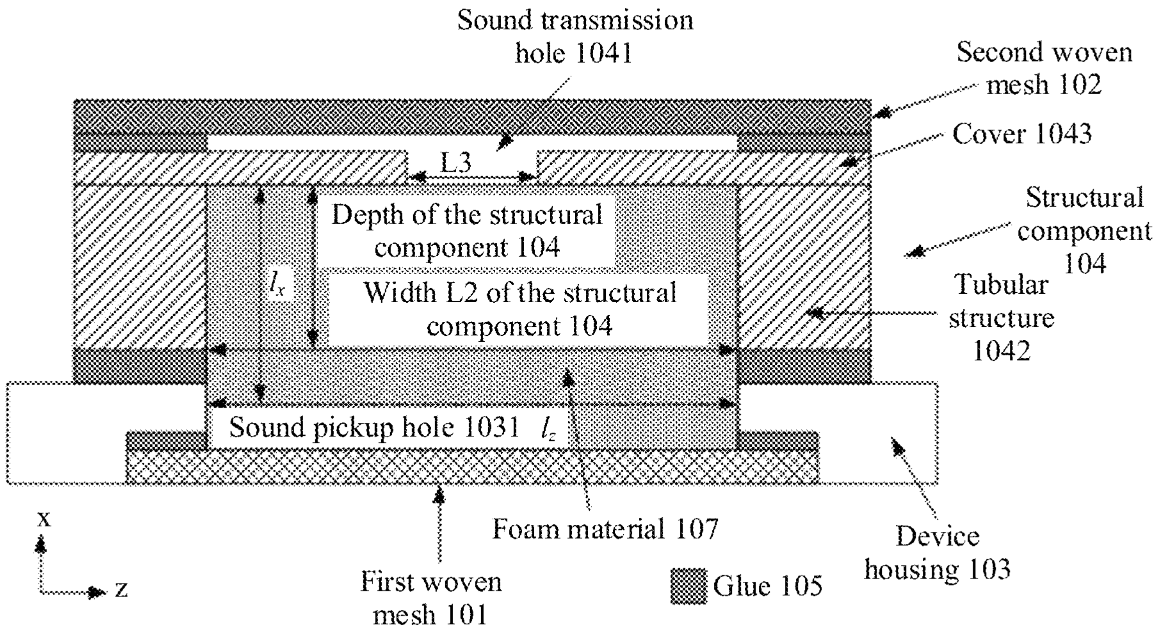
FIG. 14(*a*) and FIG. 14(*b*) are two-dimensional schematic diagrams of a wind noise suppression device filled with a metal foam material according to an embodiment of this application.
Figure 14B:
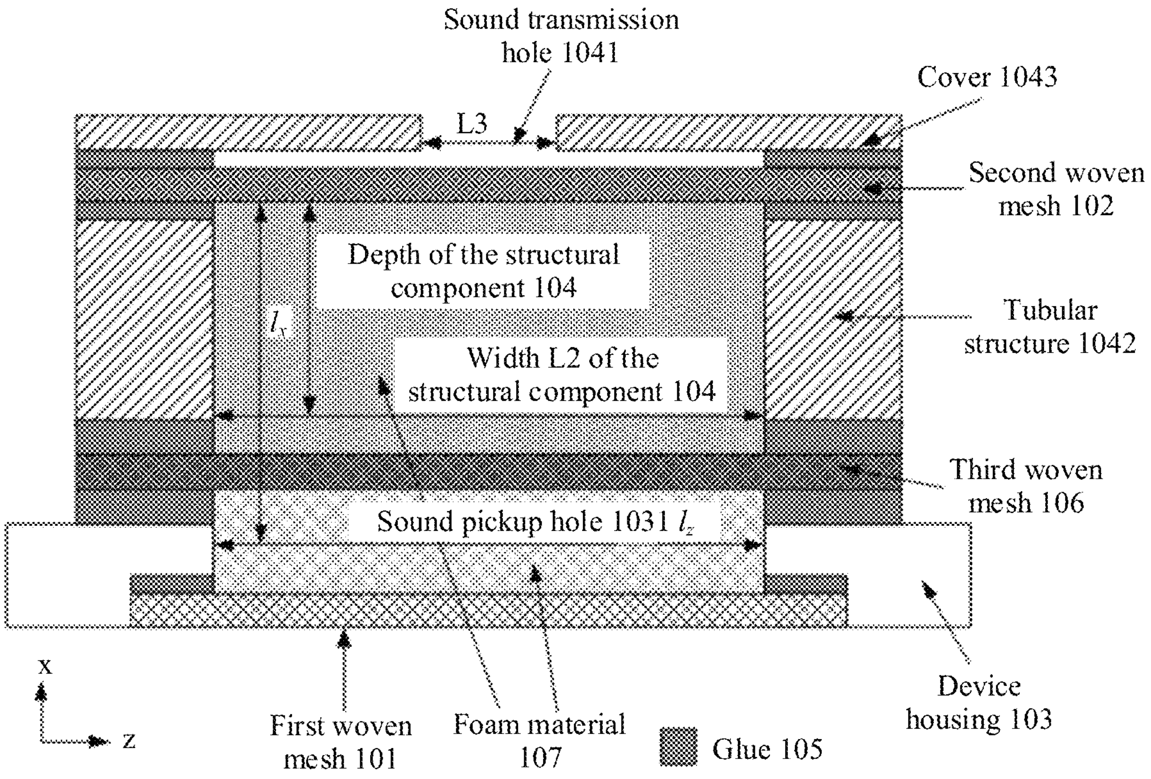

In some other embodiments, the cavity in the wind noise suppression device may be further filled with a foam material. For example, as shown in FIG. 14(*a*), the cavity formed by the first woven mesh 101, the second woven mesh 102, the device housing 103, and the structural component 104 may be further filled with a foam material 107. The foam material 107 may be a perforated foam material with a hydrophobic property. For example, the foam material 107 may be metal foam. Alternatively, a material such as polyester foam may be selected as the foam material 107. An acoustic impedance of the foam material 107 is less than 200 MKS rayls. The foam material 107 has a hydrophobic property. In this way, a flow effect of an airflow in the cavity is further reduced, thereby further reducing wind noise.

In some other embodiments, as shown in FIG. 14(*b*), the first cavity may be filled with a foam material, to reduce wind noise to a greater extent. The second cavity may also be filled with a foam material. The first cavity and the second cavity may be filled with a same foam material, or may be filled with different foam materials. The foam material is configured to reduce disturbance of an airflow inside the device caused by an airflow outside the device housing from entering the device through the sound pickup hole 1031.

Figure 15:
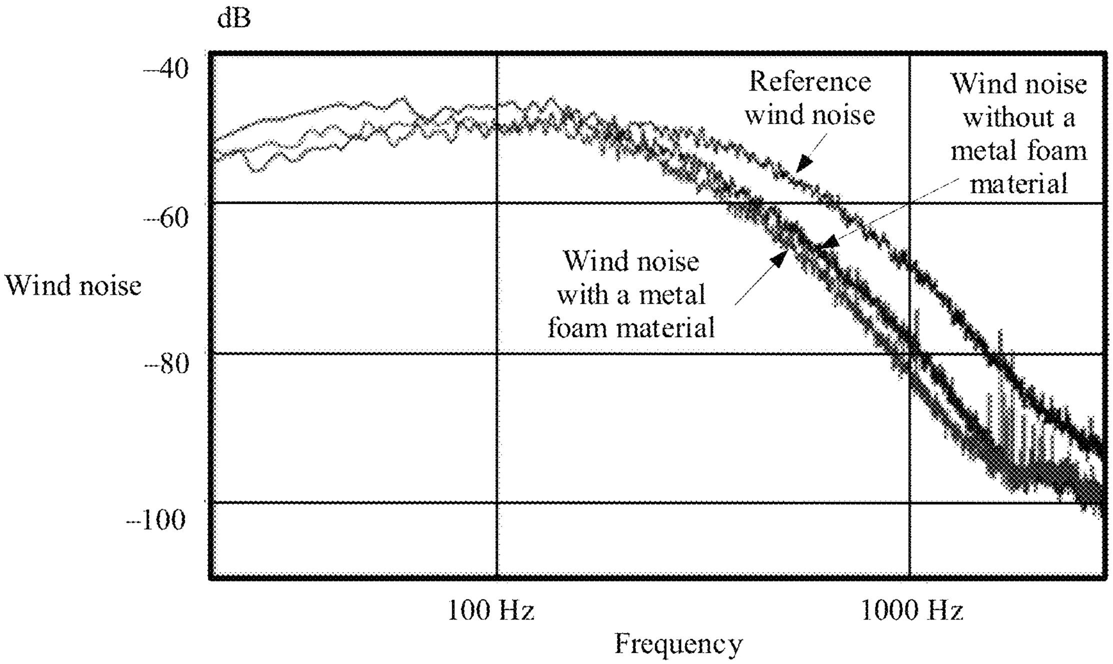
FIG. 15 is a schematic diagram of a wind noise reduction effect of wind noise suppression after a cavity is filled with a metal foam material.

FIG. 15 is a schematic diagram of a wind noise reduction effect of wind noise suppression after the cavity is filled with a metal foam material. It can be learned from the figure that, compared with a case in which the cavity is not filled with a metal foam material, filling the cavity with the metal foam material can bring an additional wind noise reduction; for example a reduction of 2-3 decibels (dB) in a whole range of 200-2000 Hz. In this way, the foam material is used for further reducing pressure fluctuation generated by a vortex, and preventing a case of a large sudden change of a flow field.

Figure 16:
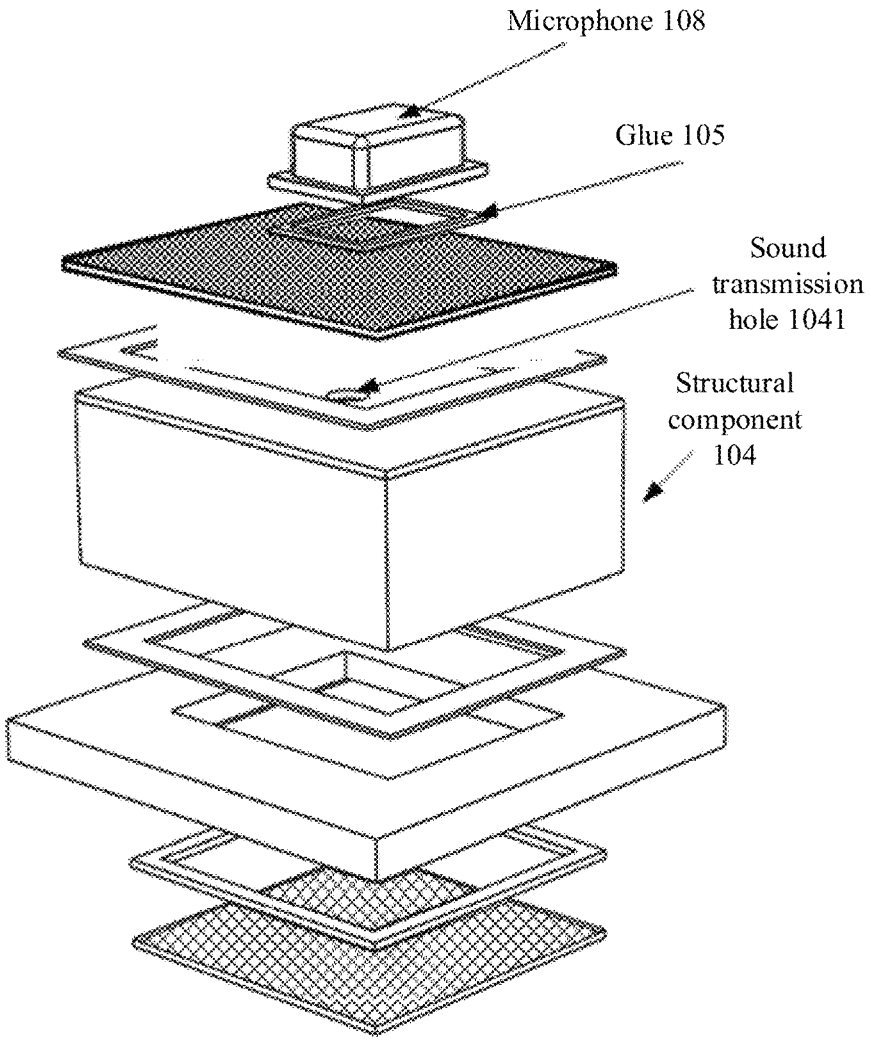
FIG. 16 is a three-dimensional schematic diagram of a wind noise suppression device connected to a microphone according to an embodiment of this application.

It should be noted that, as shown in FIG. 16, a microphone 108 is disposed at the sound transmission hole 1041 of the structural component 104, so that the microphone 108 receives a sound transmitted through the sound transmission hole 1041. The microphone 108 may be connected to the structural component 104 by using the glue 105. The microphone 108 may include a housing and a printed circuit board (PCB). The PCB board has a sound transmission hole. A size of the sound transmission hole on the PCB board is less than the size of the sound transmission hole 1041.

Figure 17:
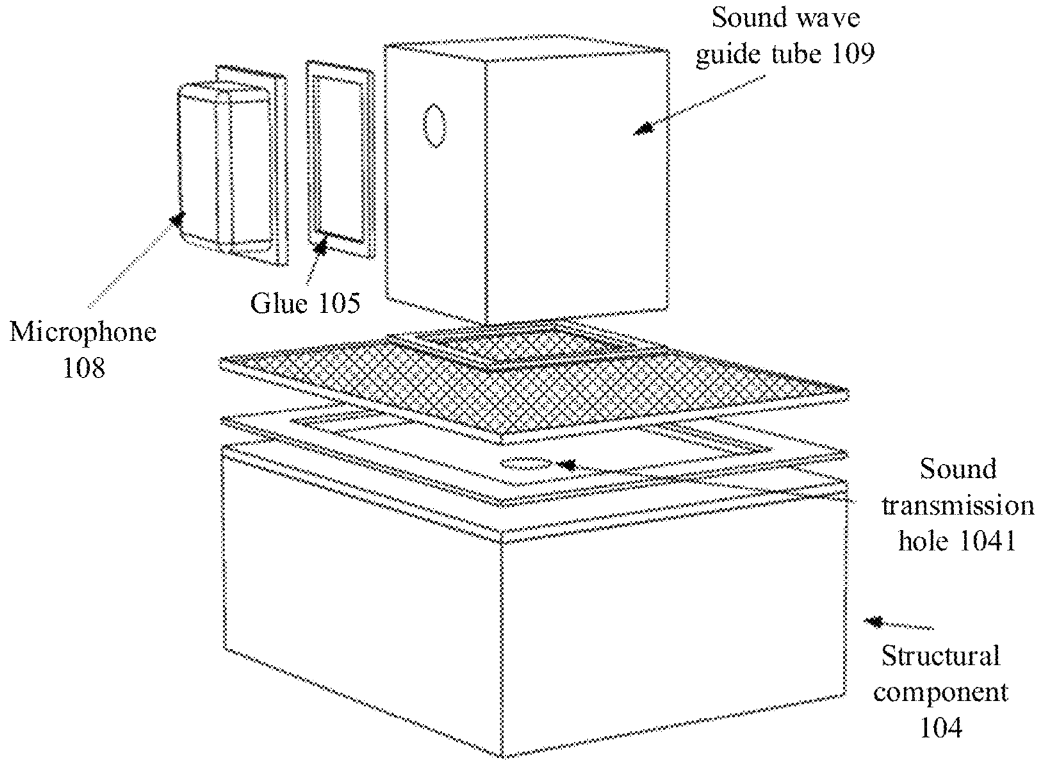
FIG. 17 is a three-dimensional schematic diagram of a wind noise suppression device including a sound wave guide tube according to an embodiment of this application.
Figure 17:
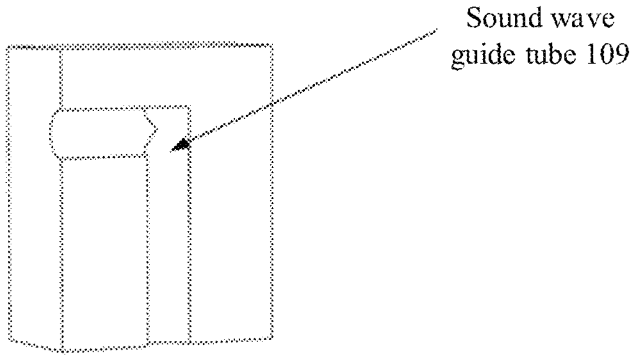

In some other embodiments, due to a limitation on the size of the structural component or a limitation on a spatial position of a component, or due to elimination of a specific acoustic mode, an acoustic resonance effect, or the like, there may be a sound wave guide tube of different shapes between the microphone 108 and the sound transmission hole 1041 of the structural component 104. The sound wave guide tube may also be referred to as a sound wave guide tube. As shown in (a) in FIG. 17, a sound wave guide tube 109 is disposed between the microphone 108 and the sound transmission hole 1041 of the structural component 104. One end of the sound wave guide tube 109 is connected to the sound transmission hole 1041 of the structural component 104, and the other end of the sound wave guide tube 109 is connected to the microphone 108. (b) in FIG. 17 shows a possible form of the sound wave guide tube 109.

In some other embodiments, an appearance of the design may be further optimized to improve a wind noise suppression capability.

Figure 18:
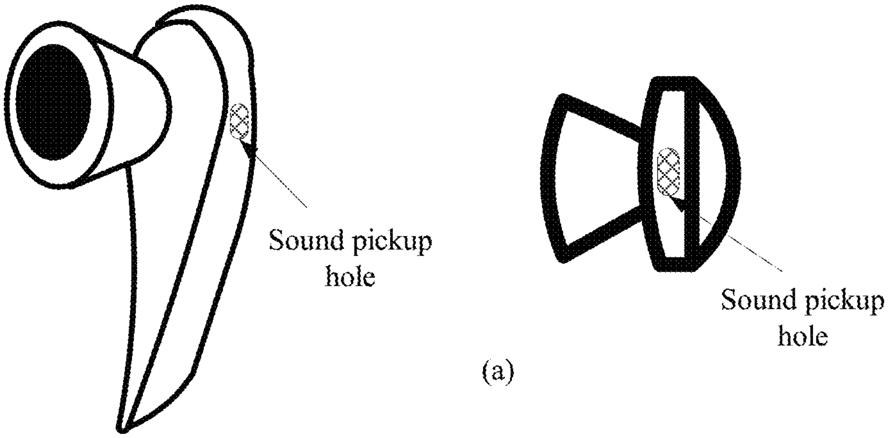
FIG. 18 is a schematic diagram of a structure of a headset and a schematic diagram of a wind noise reduction effect of wind noise suppression of the headset according to this application.
Figure 18:
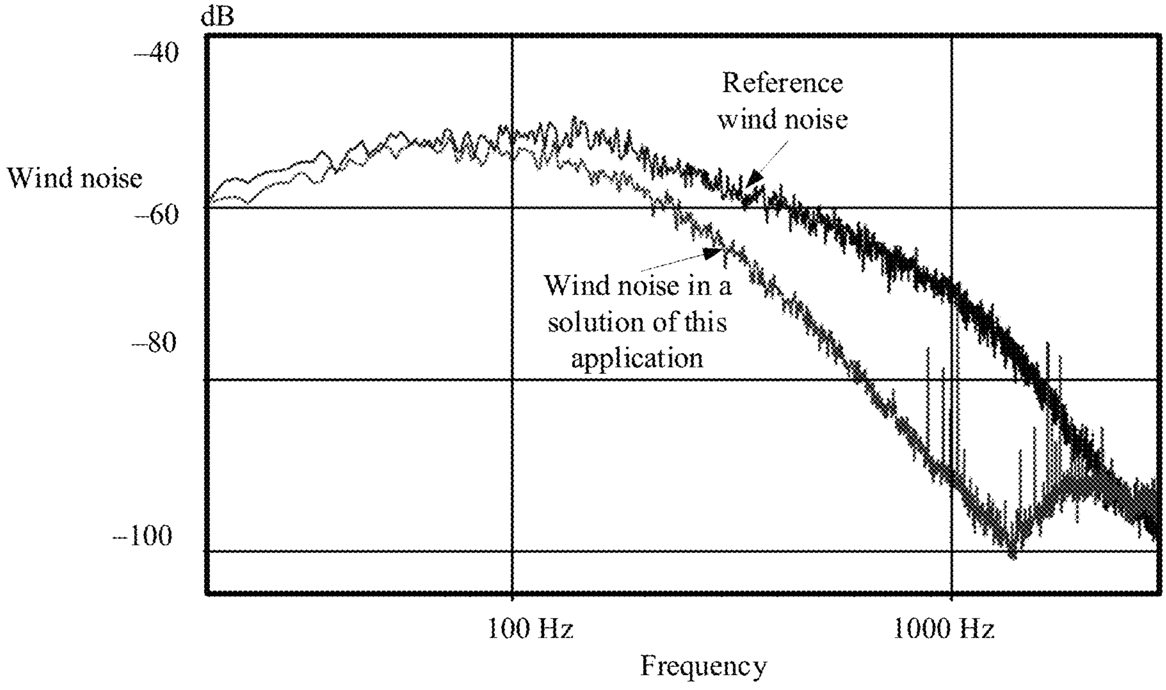

As shown in (a) in FIG. 18, for example, a side appearance of the headset is a flat water drop shape, an upper appearance part is larger, and a lower appearance part is smaller. Because appearance lines are soft, interference to a flow is small. A water drop design may be better suited to accommodate a profile of face, thereby helping avoid a vortex. The sound pickup hole is located at an upper rear side of the headset to make full use of a flow blocking effect of an auricle. A length is comparatively large in the y direction, so that reception of a pressure fluctuation caused by a vortex ahead can be reduced.

For another example, a side appearance of the headset may be an arch shape. The sound pickup hole is located at a rear side of an arch of the headset. A flow is blocked by using an auricle and the arch. A length is comparatively large in the y direction, so that pressure fluctuation caused by a vortex ahead can be reduced.

(b) in FIG. 18 is a schematic diagram of a wind noise reduction effect of wind noise suppression of a headset according to an embodiment of this application, where a side appearance of the headset is a flat water drop shape. A horizontal axis represents a frequency, and a vertical axis represents a wind noise sound pressure level or wind noise. It can be learned from the figure that, compared with a conventional headset, the headset provided in some embodiments have a comparatively large wind noise reduction of wind noise suppression in the target frequency range of 100 Hz to 1000 Hz, a wind noise reduction frequency range may exceed 3000 Hz, and a wind noise reduction may reach 14 dB to 15 dB.

It can be understood that the structure illustrated in the embodiments does not constitute a limitation on the headset. The headset may further include more or fewer components (for example, a speaker and a processor) in addition to the structural component, the woven mesh, and the microphone, or combine some components, or split some components, or have a different component arrangement. The components shown in the figures may be implemented by hardware, software, or a combination of software and hardware.

It can be understood that, to implement the functions in the method for designing the wind noise suppression device in the foregoing embodiments, a computing device includes a corresponding hardware structure and/or software module for performing each function. A person skilled in the art should be easily aware that, in combination with the units (e.g., circuits) and the method steps in the examples described in the embodiments disclosed in this application, this application can be implemented by using hardware or a combination of hardware and computer software. Whether a function is performed by using hardware or hardware driven by computer software depends on particular application scenarios and design constraints of the technical solutions.

Figure 19:
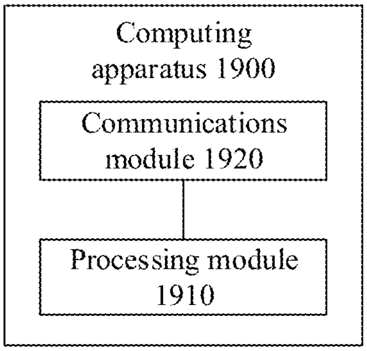
FIG. 19 is a schematic diagram of composition of a computing apparatus according to this application.
Figure 20:
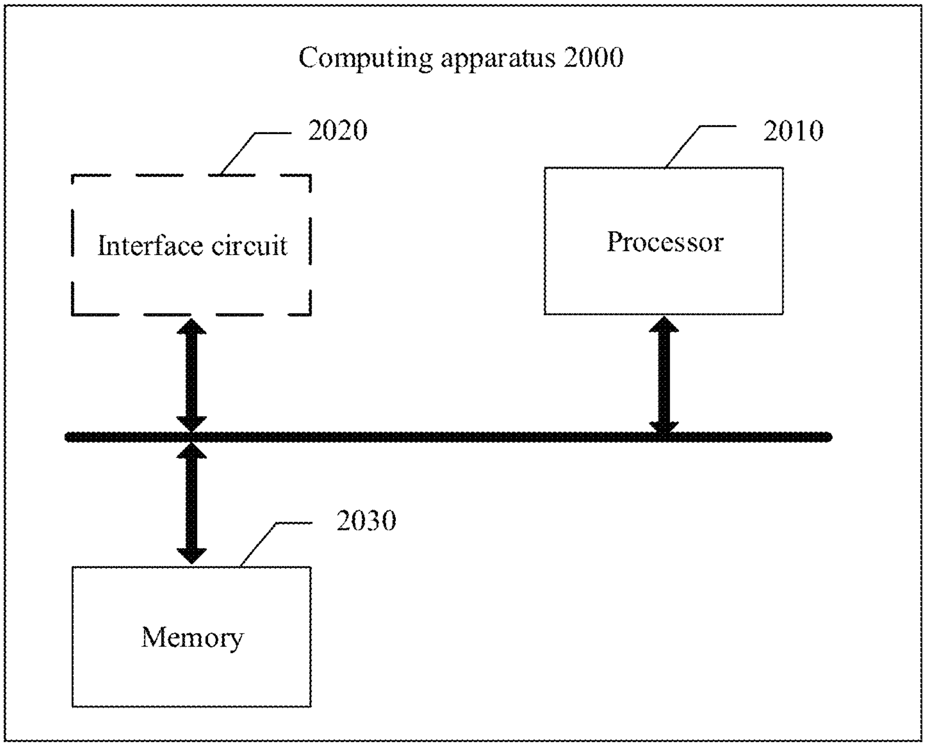
FIG. 20 is a schematic diagram of composition of another computing apparatus according to this application.

FIG. 19 and FIG. 20 are schematic diagrams of structures of possible computing apparatuses according to embodiments of this application. These computing apparatuses may be configured to implement functions of the computing device in the foregoing method embodiments, and therefore can also achieve the beneficial effects of the foregoing method embodiments.

As shown in FIG. 19, a computing apparatus 1900 includes a processing module 1910 and a communications module 1920. The computing apparatus 1900 is configured to implement the functions of the computing device in the method embodiment shown in FIG. 10.

When the computing apparatus 1900 is configured to implement the functions of the computing device in the method embodiment shown in FIG. 10, the processing module 1910 is configured to perform S1001 to S1003, and the communications module 1920 is configured to receive data required for performing S1001 to S1003, for example, a target wind speed, a target frequency, and expected wind noise reduction.

For a more detailed description about the processing module 1910, directly refer to related descriptions in the method embodiment shown in FIG. 10. Details are not described herein again.

As shown in FIG. 20, a computing apparatus 2000 includes a processor 2010 and an interface circuit 2020. The processor 2010 and the interface circuit 2020 are coupled to each other. It can be understood that the interface circuit 2020 may be a transceiver or an input/output interface. Optionally, the computing apparatus 2000 may further include a memory 2030, configured to store instructions executed by the processor 2010, or store input data needed by the processor 2010 to run instructions, or store data generated after the processor 2010 runs instructions.

When the computing apparatus 2000 is configured to implement the method shown in FIG. 10, the processor 2010 is configured to perform a function of the processing module 1910, and the interface circuit 2020 is configured to perform a function of the communications module 1920.

It can be understood that the processor in some embodiments may be a central processing unit (CPU), or may be another general purpose processor, a digital signal processor (DSP), an application-specific integrated circuit (ASIC), a field programmable gate array (FPGA) or another programmable logic device, a transistor logic device, a hardware component, or any combination thereof. The general purpose processor may be a microprocessor, or may be any conventional processor.

The method steps in the embodiments of this application may be implemented by using hardware, or may be implemented by the processor by executing software instructions. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well known in the art. An example of a storage medium is coupled to the processor, so that the processor can read information from the storage medium and can write information into the storage medium. Certainly, the storage medium may alternatively be a component of the processor. The processor and the storage medium may be located in an ASIC. In addition, the ASIC may be located in a network device or a terminal device. Certainly, the processor and the storage medium may alternatively exist as discrete components in a network device or a terminal device.

In the embodiments of this application, unless otherwise stated or there is a logic conflict, terms and/or descriptions between different embodiments are consistent and may be mutually referenced, and technical features in different embodiments may be combined into a new embodiment based on an internal logical relationship thereof.

It can be understood that various numbers in the embodiments of this application are merely intended for differentiation for ease of description, and are not intended to limit the scope of the embodiments of this application. Sequence numbers of the foregoing processes do not mean execution sequences, and the execution sequences of the processes should be determined based on functions and internal logic of the processes.

What is claimed is:

1. A wind noise suppression device comprising a first woven mesh, a second woven mesh, a device housing, a structural component, and a microphone, wherein the first woven mesh, the second woven mesh, the structural component, and the microphone are disposed within the device housing;

the device housing defines a sound pickup hole;

the first woven mesh covers the sound pickup hole and the first woven mesh is configured to reduce entry of an external airflow to the device housing;

the structural component is disposed behind the sound pickup hole;

the structural component is a hollow structure, the structural component defines a sound transmission hole, the structural component is fluidly coupled with an exterior of the device housing via the sound pickup hole, the structural component is coupled to the device housing and forms a cavity, the cavity covers the sound pickup hole, and a distance between the sound transmission hole and a plane in which the sound pickup hole is located is greater than or equal to a preset threshold;

the microphone is disposed at the sound transmission hole, and the microphone is configured to capture a sound signal; and the second woven mesh covers the sound transmission hole, and the second woven mesh is configured to prevent ingress from entering the microphone.

2. The wind noise suppression device according to claim 1, wherein the structural component comprises a tubular structure defining openings at two opposing ends of the tubular structure and a cover disposed at an opening of a first end of the tubular structure, and the cover defines the sound transmission hole.

3. The wind noise suppression device according to claim 2, wherein the sound pickup hole is covered by an orthographic projection representative of an opening at the second end of the tubular structure and that is disposed on the device housing.

4. The wind noise suppression device according to claim 2, wherein the second woven mesh is clamped between the tubular structure and the cover.

5. The wind noise suppression device according to claim 2, wherein the second woven mesh is clamped between the device housing and the structural component.

6. The wind noise suppression device according to claim 1, wherein the first woven mesh is a metal mesh, a mesh density of the first woven mesh is greater than or equal to 300 meshes, and an impedance of the first woven mesh is less than or equal to 200 meter-kilogram-second rayleighs (MKS rayls).

7. The wind noise suppression device according to claim 1, wherein the wind noise suppression device further comprises a third woven mesh, the third woven mesh is clamped between the device housing and the structural component, and the third woven mesh is configured to reduce a disturbance of an airflow inside the device caused by an airflow received from an outside of the device housing and that enters the device through the sound pickup hole.

8. The wind noise suppression device according to claim 5, wherein the wind noise suppression device further comprises a third woven mesh, the third woven mesh is clamped between the device housing and the second woven mesh, and the third woven mesh is configured to reduce a disturbance of an airflow inside the device caused by an airflow received from an outside of the device housing and that enters the device through the sound pickup hole.

9. The wind noise suppression device according to claim 7, wherein both the first woven mesh and the third woven mesh are metal meshes, a mesh density of the first woven mesh is less than or equal to a mesh density of the third woven mesh, the mesh density of the first woven mesh is less than or equal to 1000 meshes, and the mesh density of the third woven mesh is less than or equal to 1000 meshes.

10. The wind noise suppression device according to claim 1, wherein the second woven mesh is an acoustic mesh fabric, and an impedance of the second woven mesh is greater than or equal to 200 meter-kilogram-second rayleighs (MKS rayls).

11. The wind noise suppression device according to claim 1, wherein the preset threshold is determined based on an area of the sound pickup hole.

12. The wind noise suppression device according to claim 1, wherein a value range of the preset threshold is 1-30 millimeters.

13. The wind noise suppression device according to claim 1, wherein an area of the sound pickup hole is greater than an area of the sound transmission hole.

14. The wind noise suppression device according to claim 1, wherein a volume of the structural component is less than 1 cubic centimeter.

15. The wind noise suppression device according to claim 1, wherein the cavity is filled with a foam material, and the foam material is configured to reduce a disturbance of an airflow inside the device caused by an airflow received from an outside of the device housing and that enters the device through the sound pickup hole.

16. The wind noise suppression device according to claim 1, wherein the wind noise suppression device further comprises a sound wave guide tube, a first end of the sound wave guide tube is fluidly coupled to the sound transmission hole of the structural component, and a second end of the sound wave guide tube is fluidly coupled to the microphone.

17. A headset, wherein;

the headset comprises the wind noise suppression device according to claim 1;

the sound pickup hole of the headset is configured to pick up a first audio signal;

the first audio signal passes through the first woven mesh and the structural component that are in the wind noise suppression device, so that a second audio signal is obtained;

both the first audio signal and the second audio signal comprise effective audio signals; and wind noise energy comprised in the second audio signal is less than wind noise energy comprised in the first audio signal.

18. A method for designing a wind noise suppression device, comprising:

calculating flow field information of a plurality of sampling points on the device housing of the wind noise suppression device, according to claim 1, by using hydrodynamics based on a target wind speed, a target frequency, and expected wind noise reduction, wherein the flow field information comprises time-varying speeds and pressure fluctuations;

determining a sampling point that is in the plurality of sampling points and that has a smallest pressure fluctuation within a target frequency range, as a position of the sound pickup hole on the device housing of the wind noise suppression device; and determining, based on a vortex correlation length at the sound pickup hole, the target wind speed, the target frequency, the expected wind noise reduction, and a dispersion relationship of sound wave propagation in a cavity, an area of the sound pickup hole and an area of the cavity of a structural component comprised in the wind noise suppression device, wherein the vortex correlation length is determined based on the time-varying speeds and pressure fluctuations.

* * * * *